United States Patent
Uchida et al.

(10) Patent No.: US 11,960,110 B2
(45) Date of Patent: Apr. 16, 2024

(54) OPTICAL FILTER HAVING DIFFERING REFLECTANCE DEPENDING ON LIGHT INCIDENT SIDE

(71) Applicant: CANON KABUSHIKI KAISHA, Tokyo (JP)

(72) Inventors: Kazue Uchida, Tochigi (JP); Tomohiko Ishibashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 331 days.

(21) Appl. No.: 17/206,486

(22) Filed: Mar. 19, 2021

(65) Prior Publication Data

US 2021/0311236 A1  Oct. 7, 2021

(30) Foreign Application Priority Data

Apr. 7, 2020 (JP) ................ 2020-068782
Jan. 14, 2021 (JP) ................ 2021-003913

(51) Int. Cl.
*G02B 5/22* (2006.01)
*G02B 5/26* (2006.01)
*G02B 5/28* (2006.01)

(52) U.S. Cl.
CPC .............. *G02B 5/285* (2013.01); *G02B 5/22* (2013.01); *G02B 5/26* (2013.01)

(58) Field of Classification Search
CPC ................ G02B 5/08–10; G02B 5/20–289
See application file for complete search history.

(56) References Cited

U.S. PATENT DOCUMENTS

| | | | | |
|---|---|---|---|---|
| 10,859,905 | B2* | 12/2020 | Wang | G03F 1/78 |
| 2017/0003520 | A1* | 1/2017 | Iwasaki | G02C 7/10 |
| 2018/0282521 | A1* | 10/2018 | Kubo | C08K 5/521 |
| 2019/0109161 | A1* | 4/2019 | Goto | G02B 5/3016 |

FOREIGN PATENT DOCUMENTS

JP  2016038494 A  3/2016

* cited by examiner

*Primary Examiner* — Ryan S Dunning
(74) *Attorney, Agent, or Firm* — ROSSI, KIMMS & McDOWELL LLP

(57) ABSTRACT

The disclosed optical filter is provided on a substrate. The optical filter includes a first layer, an absorption layer, and a second layer in order from a substrate side. The condition of |R1−R2|≥10 is satisfied where R1 [%] represents a reflectance of the optical filter for light whose wavelength is 550 nm and that makes incident on the optical filter from a side opposite to the substrate, and R2 [%] represents a reflectance of the optical filter for light whose wavelength is 550 nm and that makes incident on the optical filter from the substrate side.

13 Claims, 19 Drawing Sheets

OPTICAL FILTER HAVING DIFFERING REFLECTANCE DEPENDING ON LIGHT INCIDENT SIDE

BACKGROUND OF THE INVENTION

Field of the Invention

The present invention relates to an optical filter that reflects part of incident light and transmits the other part thereof.

Description of the Related Art

As the above-described optical filter, a so-called half mirror is used. Japanese Patent Laid-Open No. 2016-38494 discloses an imaging apparatus provided with a half mirror as a front cover that covers internal members of the apparatus from its front side. A user as an object can see his/her image reflected by the half mirror, and thereby can capture the image while checking his/her facial expression and pose.

Further, the half mirror is also used as a cover that covers a surveillance camera such that the existence and orientation of the camera cannot be seen from the outside, and such a half mirror cover having curvature itself functions as a surveillance mirror.

In general, the half mirror has substantially the same reflectance (or transmittance) for light incident from a front surface side and light incident from a back surface side. Therefore, the half mirror cover used for the surveillance camera having a high reflectance for light incident from an object side also has a high reflectance for light incident from a camera side. Accordingly, light entering the camera from the object side, reflected by the inside of the camera and then reflected by the half mirror cover enters the camera again, which causes ghost and flare.

BRIEF SUMMARY OF THE INVENTION

The present invention provides an optical filter having different reflectances depending on a light incident direction.

The present invention provides as an aspect thereof an optical filter provided on a substrate. The optical filter includes in order from a substrate side: a first layer; an absorption layer; and a second layer. The following condition is satisfied:

$$|R1-R2|\geq 10$$

where R1 [%] represents a reflectance of the optical filter for light whose wavelength is 550 nm and that makes incident on the optical filter from a side opposite to the substrate, and R2 [%] represents a reflectance of the optical filter for light whose wavelength is 550 nm and that makes incident on the optical filter from the substrate side.

The present invention provides as other aspects thereof an optical element including the optical filter, and an imaging apparatus including the optical filter.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Figure 1:
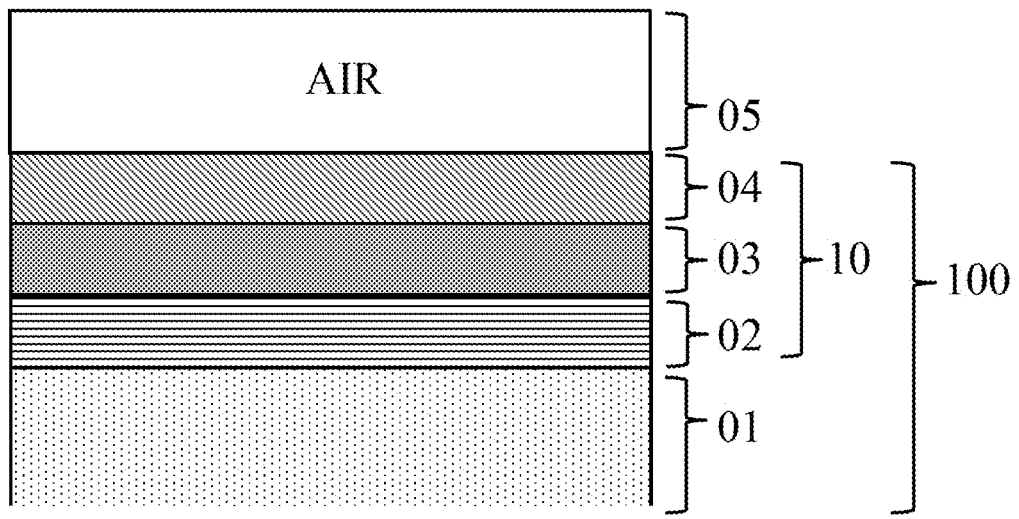
FIG. 1 is a sectional view of an optical element provided with an optical filter that is an embodiment of the present invention.

FIG. 1 illustrates an optical element 100 that is an embodiment of the present invention. The optical element 100 is constituted by a substrate 01 formed of a light-transmissive material, and an optical filter 10. The optical filter 10 is constituted by an antireflection layer 02, an absorption layer 03, and an enhanced reflection layer (or a reflection enhancing layer) 04 as a reflection layer, which are laminated in order from a substrate (01) side to an air (05) side. The enhanced reflection layer 04 is in contact with an air 05 whose refractive index is 1. The refractive index of the substrate 01 is larger than that of the air 05.

The antireflection layer 02 and the enhanced reflection layer 04 are each constituted by one or more thin film layers. The numbers of film layers of the antireflection layer 02 and the enhanced reflection layer 04 can be appropriately selected for adjusting their refractive indices, expanding their use wavelength band, reducing their incident angle dependency, and reducing their polarization dependency. Further, the absorption layer 03 is formed of one or more films of materials having light absorbency.

Figure 2:
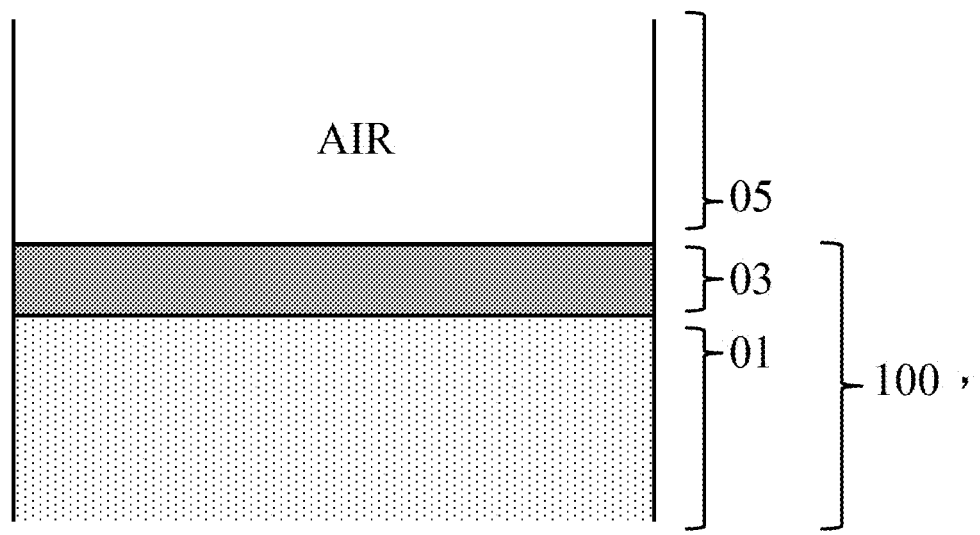
FIG. 2 is a sectional view of an optical filter as a comparative example.

FIG. 2 illustrates an optical element 100' as a comparative example in which the antireflection layer 02 and the enhanced reflection layer 04 illustrated in FIG. 1 are not provided. The absorption layer 03 provided on the substrate 01 is in contact with the air 05 whose refractive index is 1.

Figure 3:
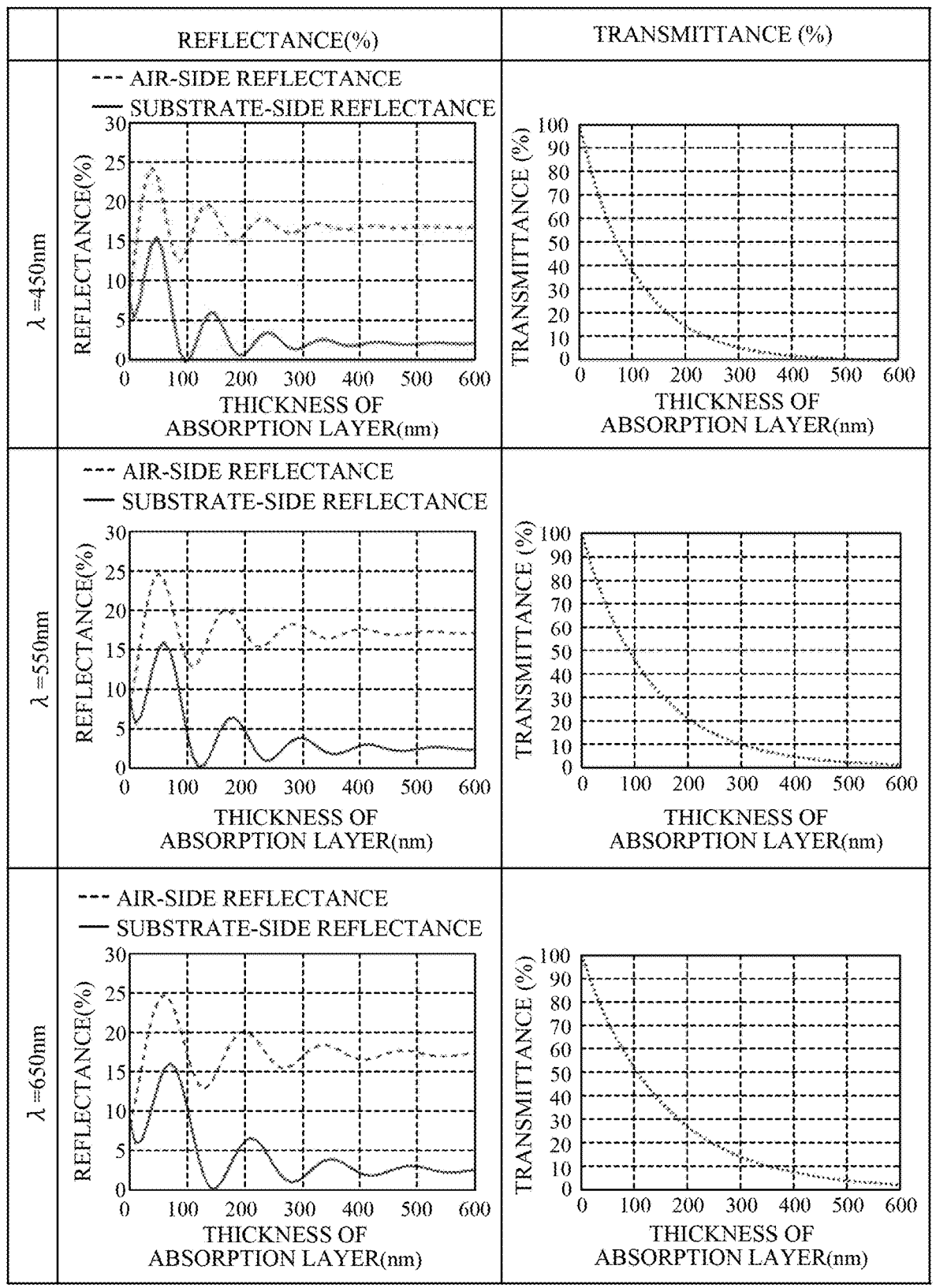
FIG. 3 is a diagram illustrating the reflectance and transmittance characteristics of the optical filter.

FIG. 3 illustrates a relation between a reflectance of the optical element 100' and a film thickness of the absorption layer 03, and a relation between a transmittance of the optical element 100' and the film thickness of the absorption layer 03 when incident lights has wavelengths λ of 450, 550, and 650 nm. The absorption layer 03 has a refractive index n of 2.35 and an extinction coefficient k of 0.05 regardless of the wavelength of the incident light.

As can be seen from graphs of the reflectance in FIG. 3, the reflectance of the optical element 100' for the incident light incident from the air side is larger than that for the incident light incident from the substrate side regardless of the film thickness. In addition, the reflectance of the optical element 100' differs depending on the wavelength of the incident light. On the other hand, as can be seen from graphs of the transmittance in FIG. 3, the transmittance of the optical element 100' is the same regardless of the direction of the incident light. Further, the thicker the film thickness of the absorption layer 03, the lower the transmittance of the optical element 100'.

From the above description, using a material having light absorbency makes it possible to manufacture an optical filter having different reflectances for the incident lights incident from the air side and the substrate side. However, the film configuration of the optical element 100' provides reflectances different depending on the wavelength of the incident light, and a small antireflection effect. Therefore, in this embodiment, as in the optical element 100 (optical filter 10) illustrated in FIG. 1, the antireflection layer 02, which is a first layer, is disposed between the absorption layer 03 and the substrate 01, and the enhanced reflection layer 04, which is a second layer, is disposed between the absorption layer 03 and the air 05. The antireflection layer 02 mainly serves as an antireflection film for the incident light from the substrate side, and the enhanced reflection layer 04 mainly serves as a reflection film for the incident light from the air side.

The optical filter 10 of this embodiment is used for light of a wavelength from 420 nm to 680 nm, which is in a visible light range. In the optical filter 10, R2 [%] represents a reflectance for an incident light whose wavelength is 550 nm and that makes incident on the optical filter 10 from the substrate side (the reflectance R2 is hereinafter referred to as "a substrate-side reflectance), and R1 [%] represents a reflectance for an incident light that makes incident on the optical filter 10 from a side opposite to the substrate 01 (the reflectance R1 is hereinafter referred to as "an air-side reflectance" or "a joining member side reflectance"). Under these definitions, it is desirable that the following condition of expression (1) be satisfied:

$$|R1-R2|\geq 10[\%].\qquad(1)$$

The optical filter 10 of this embodiment is different from general half mirrors in that its reflectance differs depending on the direction of the incident light. As a result, the optical filter 10 serves as an antireflection film for an incident light from one side, and serves as a reflection film for an incident light from the other side.

It is more preferable that the numerical range of expression (1) be set as follows:

$$80\geq|R1-R2|\geq 15[\%].\qquad(1)'$$

It is further preferable that the numerical range of expression (1) be set as follows:

$$60\geq|R1-R2|\geq 18[\%].\qquad(1)''$$

The optical filter 10 includes the antireflection layer 02 as the first layer, the absorption layer 03, and the enhanced reflection layer 04 as the second layer, which are laminated in order from the substrate side. When the absorption layer 03 is constituted by m (plural) films, kj represents an extinction coefficient of a j-th film counted from the substrate side among the m films (the j-th film is hereinafter referred to as "an absorption j film"), and dj represents a physical film thickness of the absorption j film, it is desirable that the following condition of expression (2) be satisfied:

$$8\leq \sum_{j=1}^{m} kj\times dj \leq 132.\qquad(2)$$

In expression (2), the value of kj×dj is a coefficient that determines the transmittance of the absorption layer 03. When the total sum of kj×dj is larger than 132, the transmittance becomes extremely small, and thereby the optical element 10 cannot be used as an element that transmits light. On the other hand, when the total sum of kj×dj is smaller than 8, it becomes difficult to increase the difference between the reflectances R1 and R2.

It is desirable that a refractive index nj of the absorption j film satisfy the following condition of expression (3):

$$1.8\leq nj\leq 4.2.\qquad(3)$$

Refractive indices of dielectric materials each having an extinction coefficient and being able to be easily produced by a dry film forming method such as thin film deposition or sputtering are included within this range.

It is more preferable that the numerical range of expression (3) be set as follows:

$$2.0\leq nj\leq 3.6.\qquad(3)'$$

Furthermore, it is desirable that the extinction coefficient kj of the absorption j film satisfy the following condition of expression (4):

$$0.05\leq kj\leq 4.00.\qquad(4)$$

When the extinction coefficient kj is less than 0.05, it is necessary to control an amount of oxygen introduced into a dry film forming apparatus with high accuracy, and the amount of oxygen depends on an adhered amount of film forming substances in the apparatus, which makes it difficult to form the film whose extinction coefficient is less than 0.05 with good reproducibility. On the other hand, when the extinction coefficient kj is larger than 4.00, a film thickness for realizing required characteristics becomes very small, which undesirably makes film thickness control difficult.

It is more preferable that the numerical range of expression (4) be set as follows:

$$0.10\leq kj\leq 3.60.\qquad(4)'$$

The material of the substrate 01 is glass, plastic or the like, and is not particularly limited. The substrate 01 may have a flat plate shape, a convex shape, a concave shape or the like, or may have a curved surface shape other than a spherical surface.

A desirable method of forming the absorption layer 03 is the dry film forming method such as the thin film deposition or the sputtering. However, a wet film forming method such as a plating method or spin coating may be used. Further, it is enough that the material of the absorption layer 03 satisfies the above-mentioned conditions relating to the extinction coefficient k (conditional expressions (2) and (4)). Such materials include oxygen-deficient $TiO_2$ film, $Nb_2O_5$ film, $Ta_2O_5$ film, ITO film, Cr film and the like.

A desirable method of forming the first layer and the second layer is also the dry film forming method such as the thin film deposition or the sputtering. However, the wet film forming method such as the plating method or the spin coating may be used. It is preferable that each of the first layer and the second layer be formed of a film material having no light absorbency. Such a film material makes it possible to reduce light absorption generated in the optical filter of this embodiment, which enables realizing a high transmittance. The extinction coefficient of the film material of the first layer and the second layer at the wavelength of 550 nm is preferably 0.02 or less, more preferably 0.01 or less, and still more preferably 0.005 or less.

Further, when the air-side reflectance R1 is larger than the substrate-side reflectance R2 (that is, R1−R2≥10[%]), it is desirable that the following condition of expression (5) be satisfied:

$$0 \leq R2/R1 \leq 0.5. \tag{5}$$

Since the reflectances R1 and R2 have values of 0 or more, the value of R2/R1 does not fall below the lower limit of expression (5). When the air-side reflectance R1 is so small that the value of R2/R1 exceeds the upper limit of expression (5), it becomes difficult for a person to see his/her own image by using air-side reflection of the optical filter 10.

It is more preferable that the numerical range of expression (5) be set as follows:

$$0 \leq R2/R1 \leq 0.4. \tag{5'}$$

On the other hand, when the substrate-side reflectance R2 is larger than the air-side reflectance R1 (that is, R2−R1≥10[%]), it is desirable that the following condition of expression (6) be satisfied:

$$0 \leq R1/R2 \leq 0.5. \tag{6}$$

Since the reflectances R1 and R2 have values of 0 or more, the value of R1/R2 does not fall below the lower limit of expression (6). When the substrate-side reflectance R2 is so small that the value of R1/R2 exceeds the upper limit of expression (6), it becomes difficult for a person to see his/her own image by using substrate-side reflection of the optical filter 10.

It is more preferable that the numerical range of expression (6) be set as follows:

$$0 \leq R1/R2 \leq 0.4. \tag{6'}$$

The enhanced reflection layer 04 as the second layer includes an outermost film disposed on a side opposite to the absorption layer 03. When the outermost film is in contact with a medium, and dn represents a difference in refractive index between the outermost film of the enhanced reflection layer 04 and the medium, it is desirable that the following condition of expression (7) be satisfied:

$$dn \leq 0.50. \tag{7}$$

When the refractive index difference dn is so large that it exceeds the upper limit of expression (7), it becomes difficult to sufficiently reduce reflection generated at an interface therebetween by using an interference action.

It is more preferable that the numerical range of expression (7) be set as follows:

$$dn \leq 0.40. \tag{7'}$$

The second layer may be in close contact with an optical component via a joining member such that the optical filter is disposed at a joining interface so as not to be exposed to an atmosphere. Compared to when the second layer is in contact with the air, differences between the refractive indices of a substrate-side outermost film and an opposite-to-substrate-side outermost film of the optical filter and the refractive indices of the members adjacent to these outermost films become smaller, so that a further antireflection effect can be provided.

When ns, ne and na respectively represent refractive indices of the substrate, the optical component and the joining member at the wavelength of 550 nm, it is desirable that the following condition of expression (8) be satisfied:

$$|ns-na| \leq |ne-na| \tag{8}$$

Satisfying this condition makes it possible to reduce the refractive index difference between the outermost film of the optical filter and the adjacent member, which can provide a further antireflection effect.

Specific embodiments (Embodiments 1 to 23) will be described below. The described embodiments are merely examples, and embodiments of the present invention include ones other than the described ones.

Figures 4A, 4B:
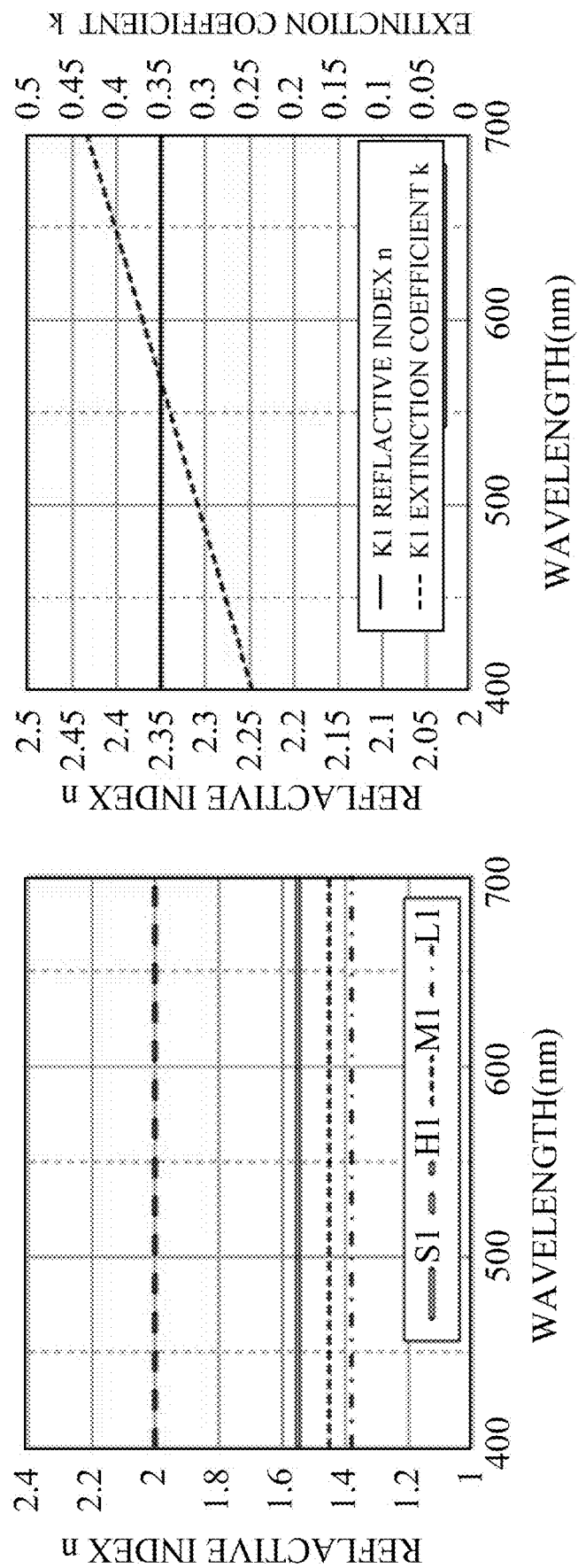
FIGS. 4A and 4B are diagrams illustrating refractive indices and an extinction coefficient of materials used in optical filters of Embodiments 1 to 5.
Figure 5A:
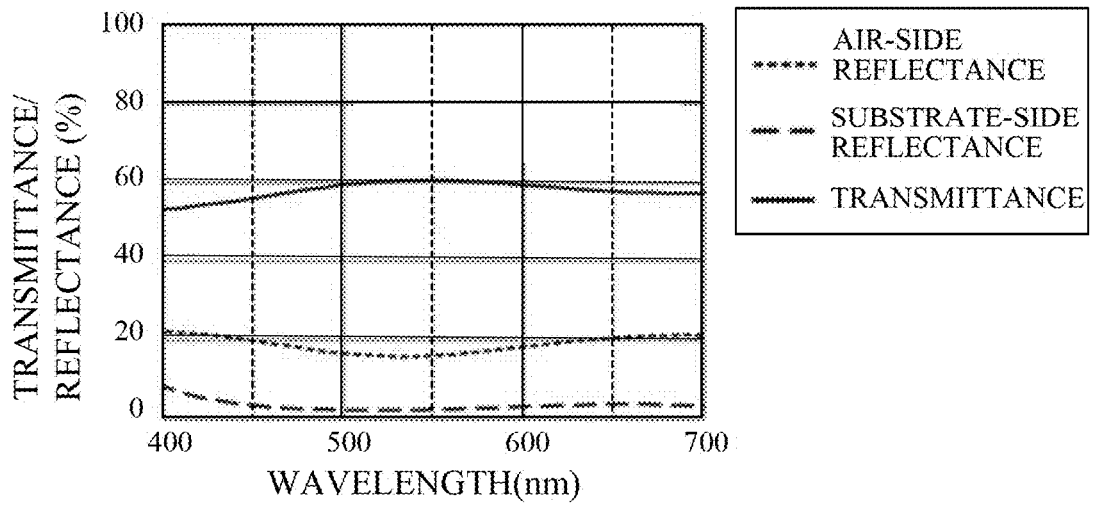
FIGS. 5A to 5E are diagrams illustrating reflectance transmittance characteristics of the optical filters of Embodiments 1 to 5.
Figure 5B:
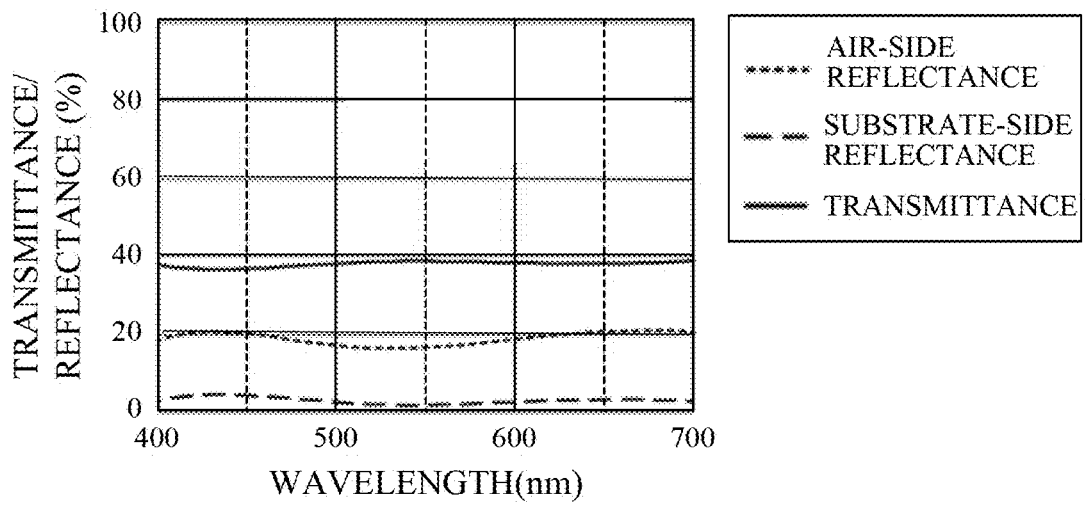
Figure 5C:
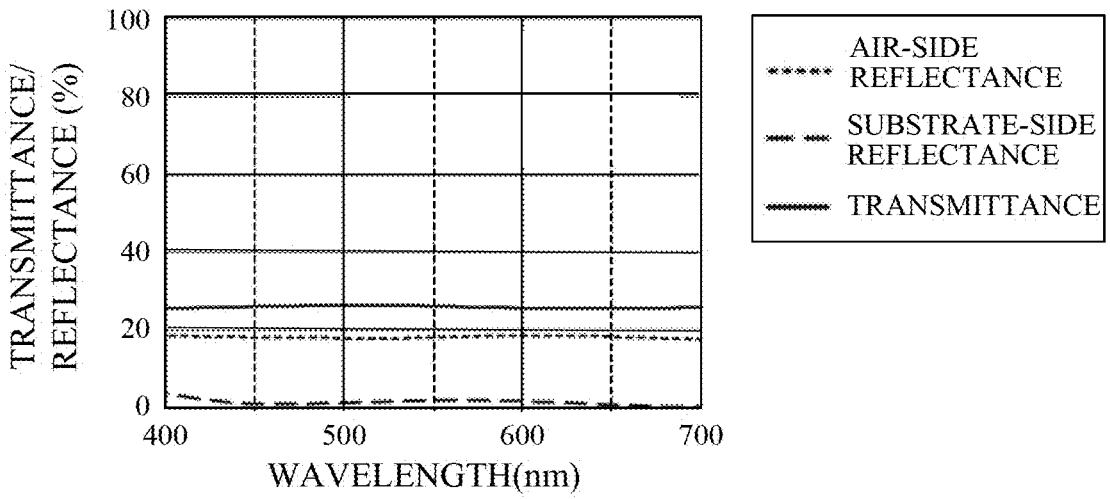
Figure 5D:
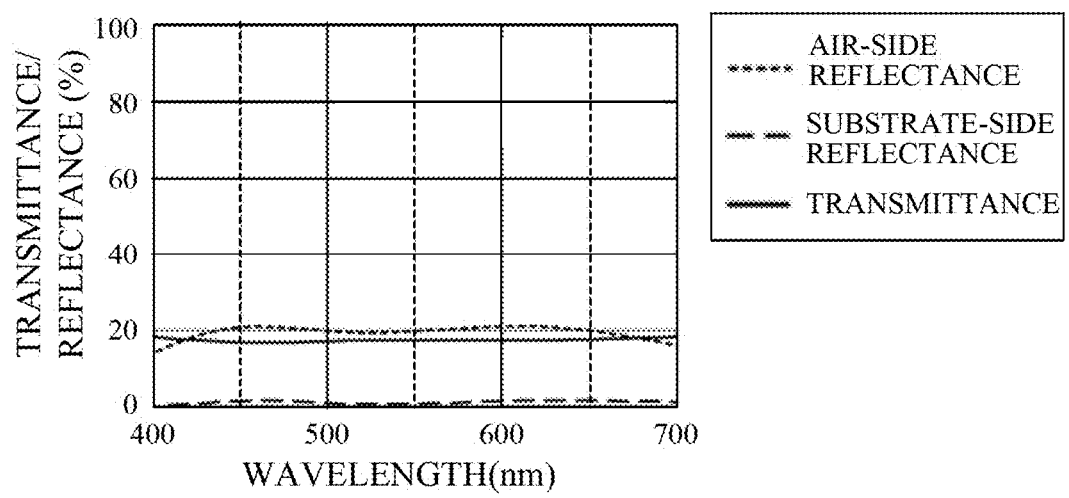
Figure 5E:
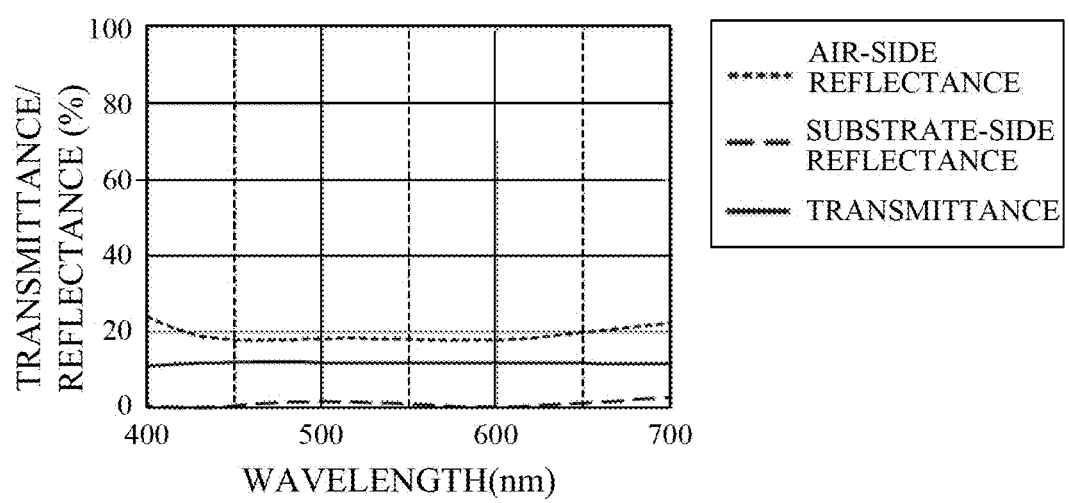

Table 1 shows the film configurations of optical filters of Embodiments 1 to 5. In each embodiment, the material of the substrate 01 is a glass material S1 having no light absorbency. The material of the antireflection layer 02 as the first layer is a dielectric material H1. The enhanced reflection layer 04 as the second layer is formed as a multilayer film in which dielectric materials M1, H1 and L1 are laminated in order from a side of the absorption layer 03 (absorption layer side). The number of films (2) of the enhanced reflection layer 04 as the multilayer film is larger than that (1) of the antireflection layer 02. The dielectric materials M1, H1 and L1 have no light absorbency. FIG. 4A illustrates refractive indices of the glass material S1 and the dielectric materials M1, H1 and L1 at each wavelength.

The material of the absorption layer 03 is an absorbent material K1 having light absorbency. FIG. 4B illustrates the refractive index and the extinction coefficient of the absorbent material K1 at each wavelength. The extinction coefficient of the absorbent material K1 at the wavelength λ of 550 nm is 0.34.

FIGS. 5A to 5D respectively illustrate the air-side reflectances, the substrate-side reflectances and the transmittances of the optical filters of Embodiments 1 to 5 at each wavelength. As can be seen from these drawings, the difference between the air-side reflectance and the substrate-side reflectance of the optical filter of each of Embodiments 1 to 5 at the wavelength of 550 nm is 10% or more, which satisfies the condition of expression (1) (further the condition of expression (1)').

The film thicknesses of the absorbent material K1 in Embodiments 1 to 5 are, as shown in Table 1, 50 nm, 100 nm, 150 nm, 200 nm, and 250 nm, respectively. The value of kj×dj in each of Embodiments 1 to 5 satisfies the condition of expression (2).

TABLE 1

| | | Refractive Index | Extinction Coefficient | Embodiment | | | | |
|---|---|---|---|---|---|---|---|---|
| | | $\lambda = 550$ nm | $\lambda = 550$ nm | 1 | 2 | 3 | 4 | 5 |
| | | | | FilmThickness(nm) | | | | |
| 5 | L1 | 1.38 | | 102.5 | 42.3 | 90.9 | 67.1 | 93.0 |
| 4 | H1 | 2.0 | | 80.8 | 71.8 | 86.8 | 16.1 | 54.6 |
| 3 | M1 | 1.45 | | 36.5 | 26.3 | 60.0 | 84.4 | 71.7 |
| 2 | K1 | 2.35 | 0.34 | 50.0 | 100.0 | 150 | 200 | 250 |
| 1 | H1 | 2.0 | | 51.3 | 47.3 | 48.0 | 48.4 | 36.9 |
| | S1 | 1.55 | | | | | | |

Table 2 shows the film configurations of optical filters of Embodiments 6 to 10. Also in these embodiments, the material of the substrate 01 is the glass material S1 as in Embodiments 1 to 5. The antireflection layer 02 as the first layer is formed as a multilayer film in which the dielectric materials H1, M1 and H1 are laminated in order from the substrate side. The enhanced reflection layer 04 as the second layer is formed as a multilayer film in which the dielectric materials M1, H1, M1, H1 and M1 are laminated in order from the absorption layer side. The number of films (5) of the enhanced reflection layer 04 as the multilayer film is larger than that (3) of the antireflection layer 02 as the multilayer film.

Figure 6B:
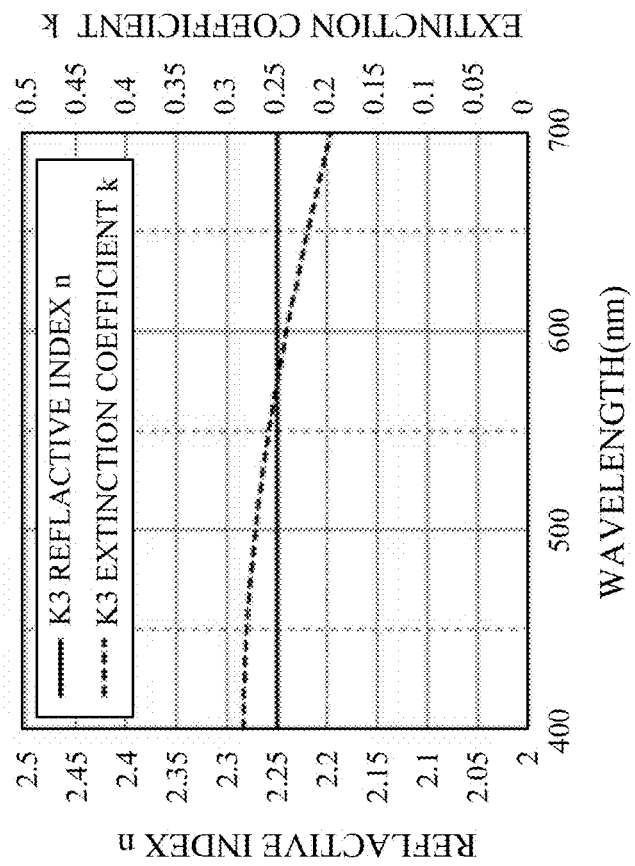
FIGS. 6A and 6B are diagrams illustrating refractive indices and extinction coefficients of absorbent materials K2 and K3 used in optical filters of Embodiments 6 to 10.
Figure 6A:
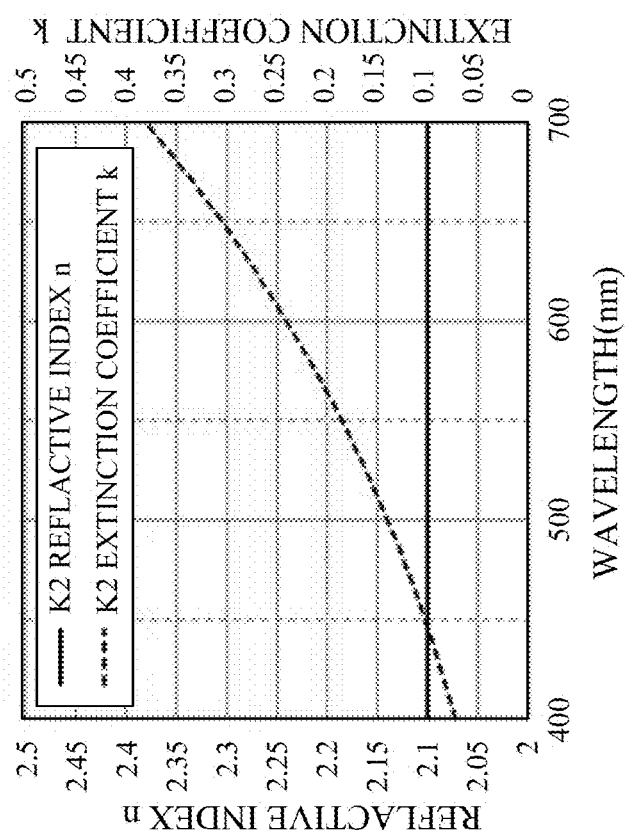
Figure 7A:
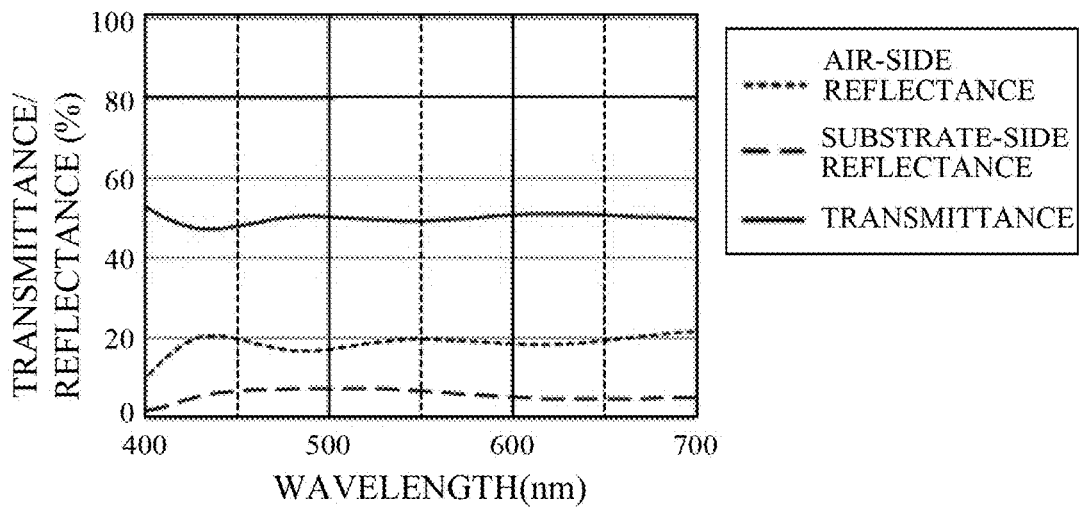
FIGS. 7A to 7E are diagrams illustrating reflectance and transmittance characteristics of the optical filters of Embodiments 6 to 10.
Figure 7B:
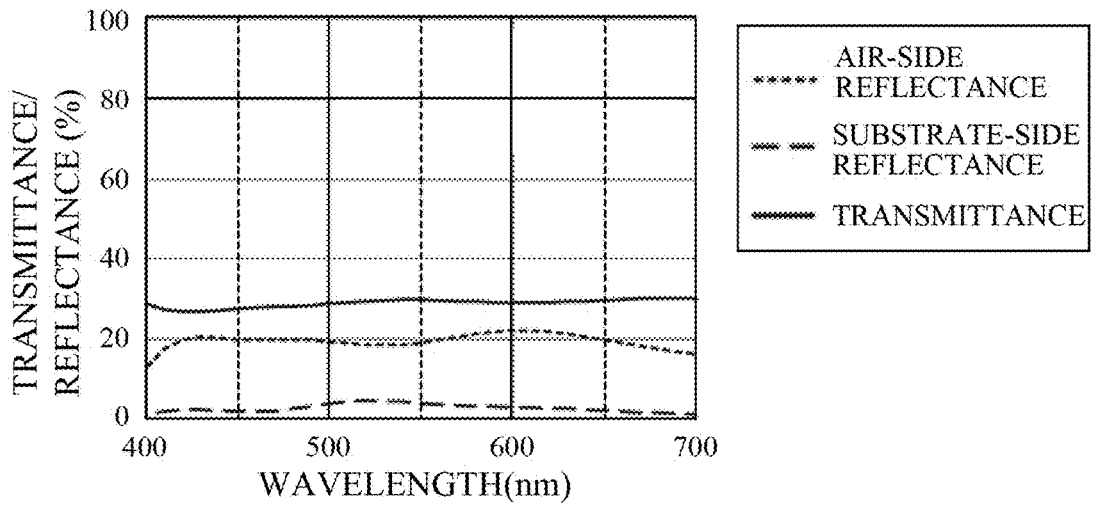
Figure 7C:
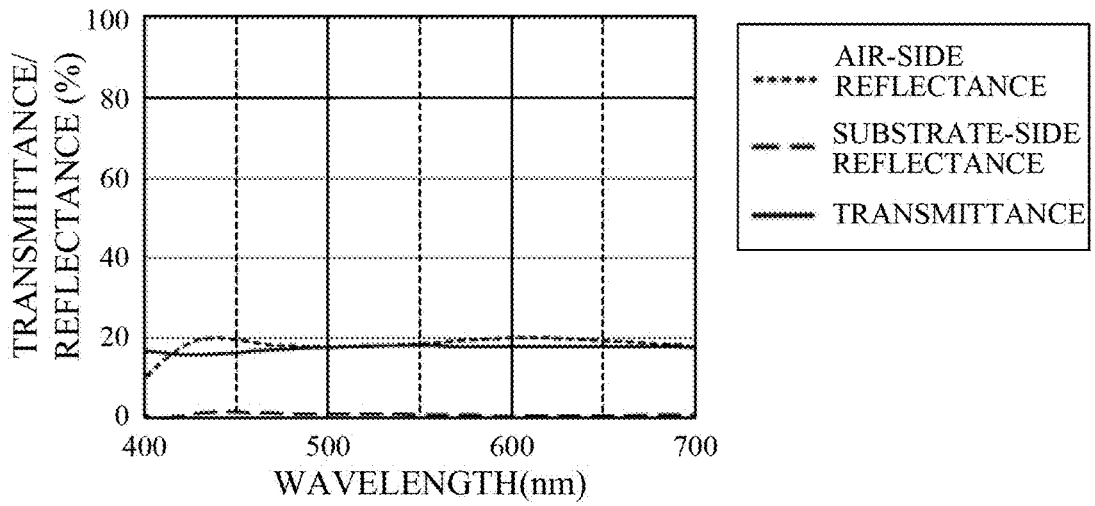
Figure 7D:
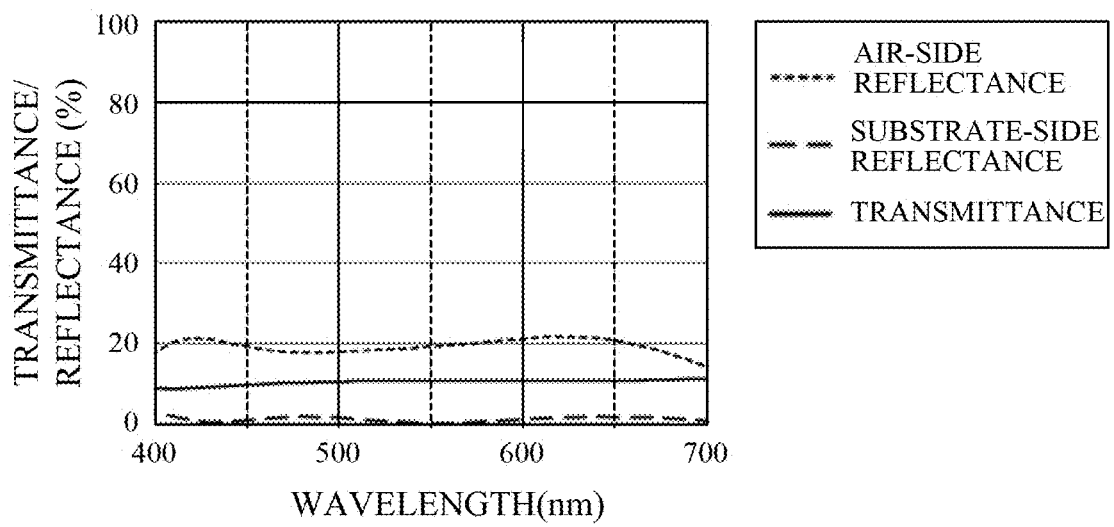
Figure 7E:
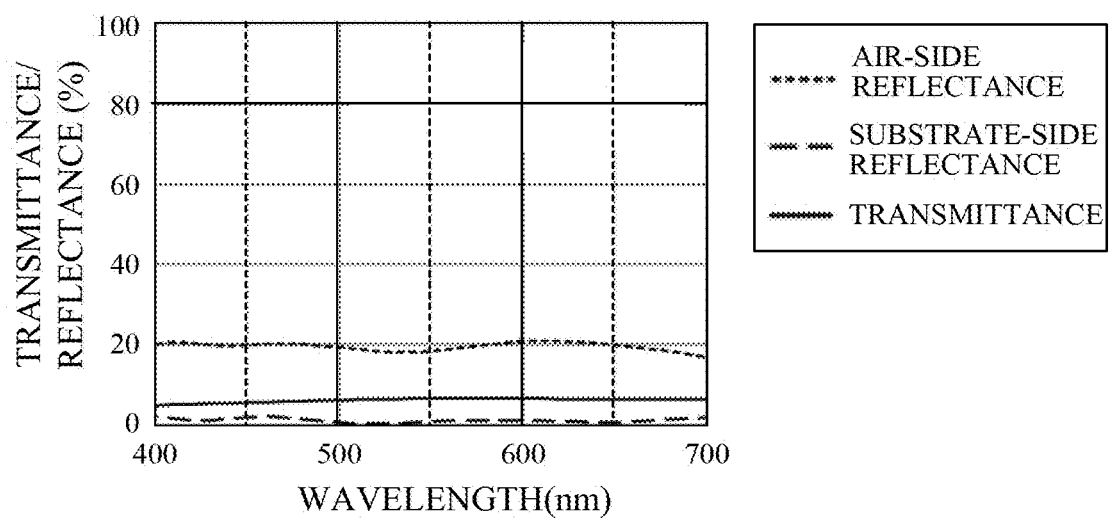

The absorption layer 03 is formed as a multilayer film in which absorbent materials K3 and K2 are laminated in order from a side of the antireflection layer 02 (antireflection layer side). FIGS. 6A and 6B respectively illustrate the refractive indices and the extinction coefficients of the absorbent materials K2 and K3 at each wavelength. The extinction coefficient of the absorbent material K2 at the wavelength of 550 nm is 0.19, and the extinction coefficient of the absorbent material K3 at the wavelength of 550 nm is 0.26.

FIGS. 7A to 7D respectively illustrate the air-side reflectances, the substrate-side reflectances and the transmittances of the optical filters of Embodiments 6 to 10 at each wavelength. As can be seen from these drawings, the difference between the air-side reflectance and the substrate-side reflectance of the optical filter of each of Embodiments 6 to 10 at the wavelength $\lambda$ of 550 nm is 10% or more, which satisfies the condition of expression (1) (further the condition of expression (1)').

The film thicknesses of the absorbent materials K2 and K3 in Embodiments 6 to 10 are, as shown in Table 2, 50 nm, 100 nm, 150 nm, 200 nm and 250 nm, respectively. The value of $kj \times dj$ in each of Embodiments 6 to 10 satisfies the condition of expression (2).

TABLE 2

| | | Refractive Index | Extinction Coefficient | Embodiment | | | | |
|---|---|---|---|---|---|---|---|---|
| | | $\lambda = 550$ nm | $\lambda = 550$ nm | 6 | 7 | 8 | 9 | 10 |
| | | | | Film Thickness (nm) | | | | |
| 10 | M1 | 1.45 | | 128.6 | 136.6 | 110.8 | 87.6 | 89.0 |
| 9 | H1 | 2.0 | | 47.4 | 77.6 | 52.9 | 67.2 | 69.0 |
| 8 | M1 | 1.45 | | 125.8 | 104.0 | 49.4 | 28.8 | 61.0 |
| 7 | H1 | 2.0 | | 94.2 | 147.6 | 111.4 | 101.7 | 100.0 |
| 6 | M1 | 1.45 | | 15.6 | 12.6 | 49.5 | 55.6 | 25.9 |
| 5 | K2 | 2.10 | 0.19 | 50.0 | 100.0 | 150.0 | 200.0 | 250.0 |
| 4 | K3 | 2.25 | 0.26 | 50.0 | 100.0 | 150.0 | 200.0 | 250.0 |
| 3 | H1 | 2.0 | | 48.4 | 53.8 | 64.8 | 26.6 | 10.0 |
| 2 | M1 | 1.45 | | 42.0 | 29.7 | 38.9 | 26.9 | 22.7 |
| 1 | H1 | 2.0 | | 10.0 | 10.5 | 18.9 | 16.9 | 20.6 |
| | S1 | 1.55 | | | | | | |

Figure 8B:
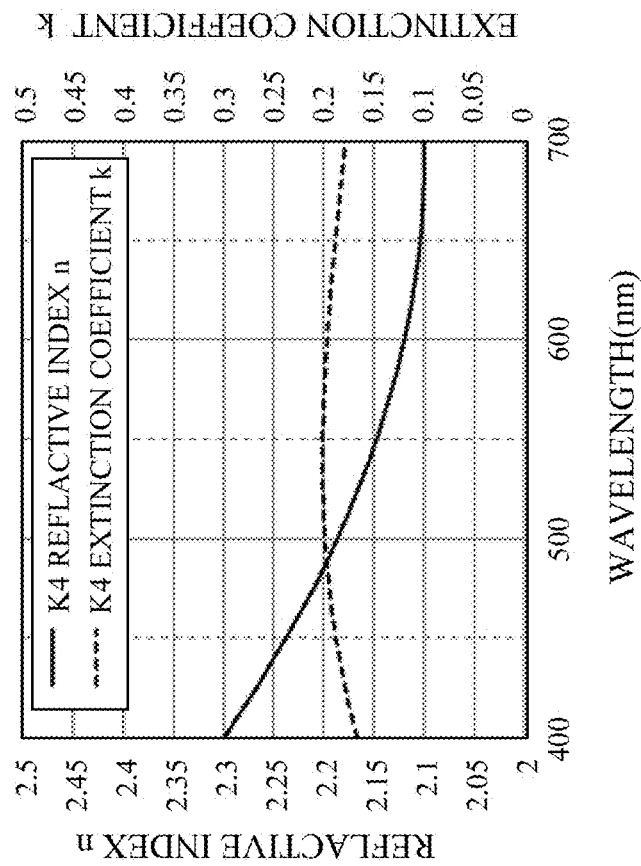
FIGS. 8A and 8B are diagrams illustrating refractive indices and an extinction coefficient of materials used in optical filters of Embodiments 11 to 17.
Figure 8A:
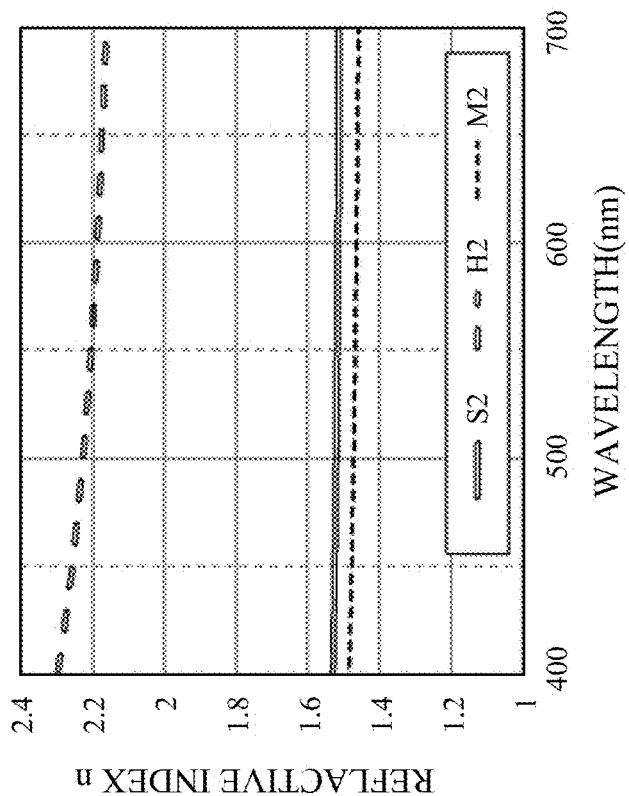
Figure 9A:
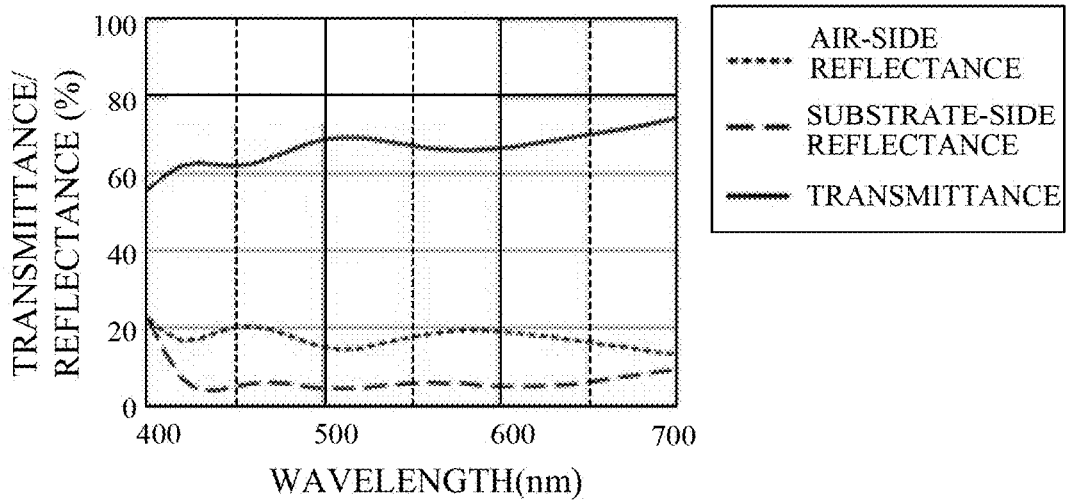
FIGS. 9A to 9G are diagrams illustrating reflectance and transmittance characteristics of the optical filters of Embodiments 11 to 17.
Figure 9B:
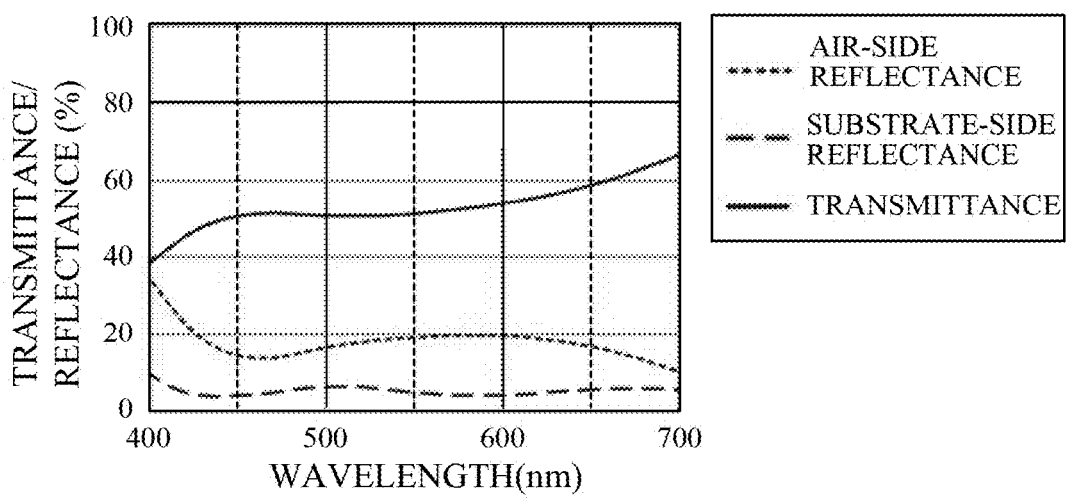
Figure 9C:
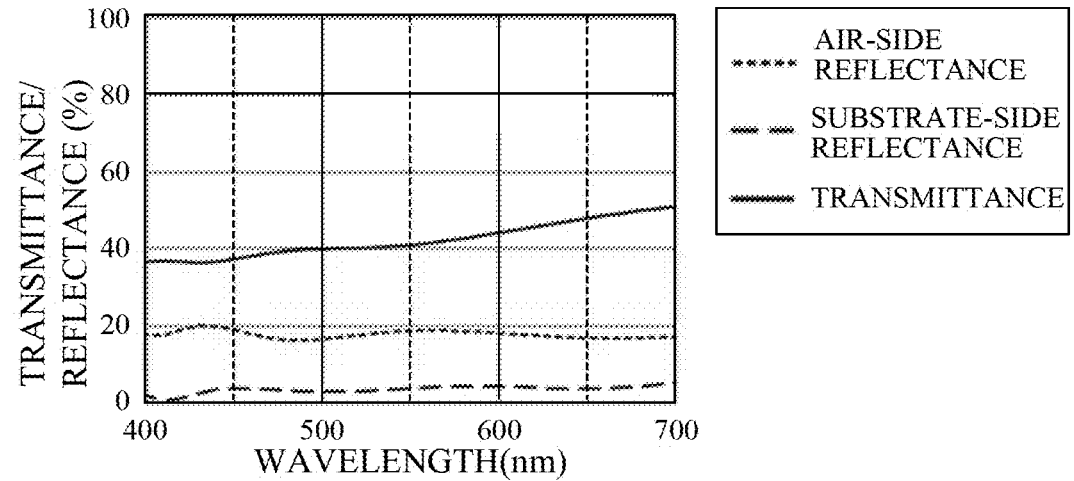
Figure 9D:
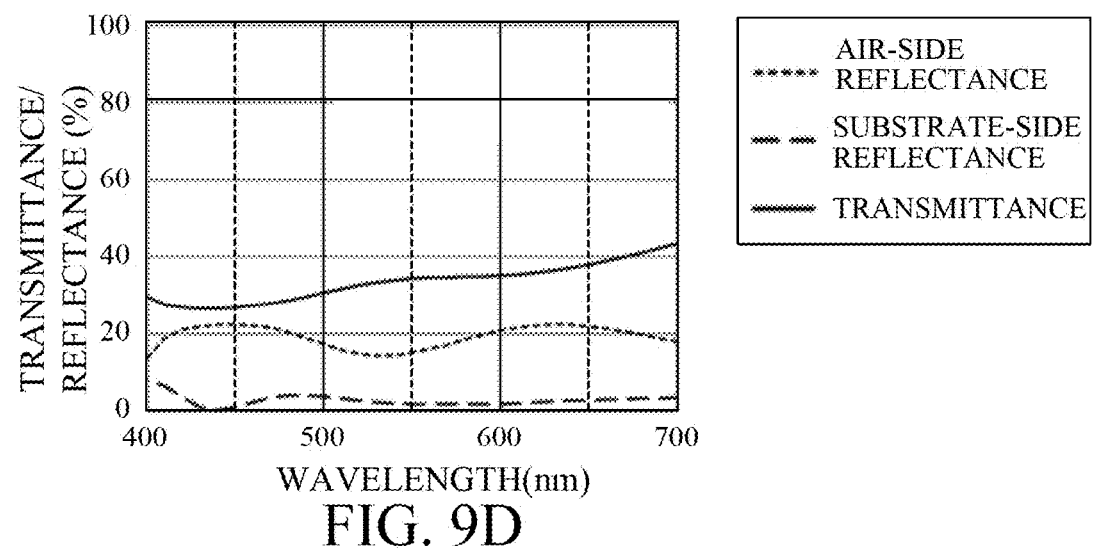
Figure 9E:
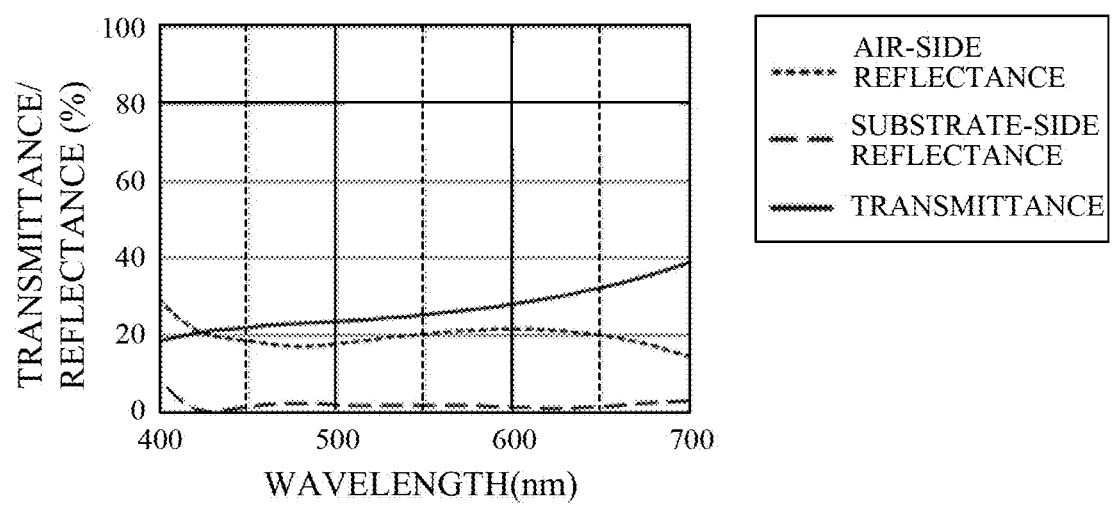
Figure 9F:
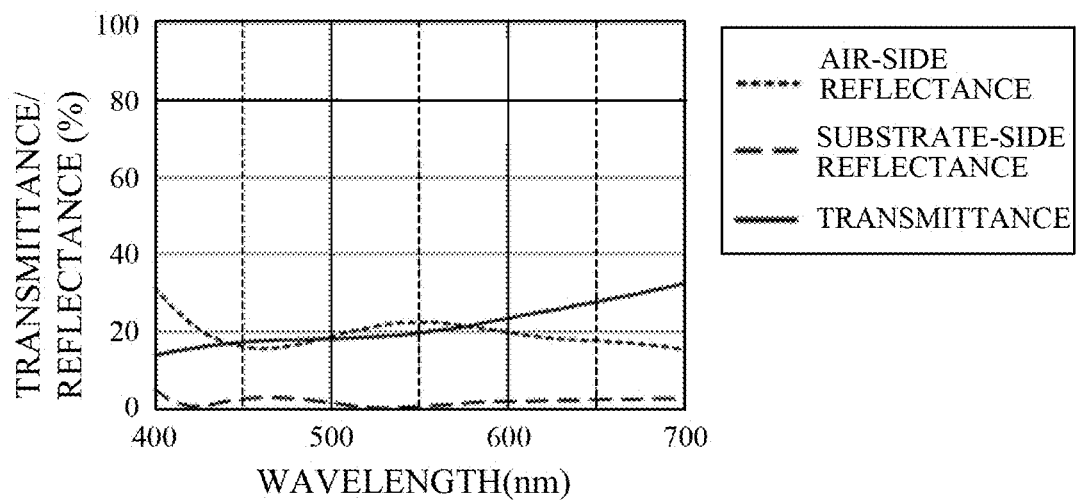
Figure 9G:
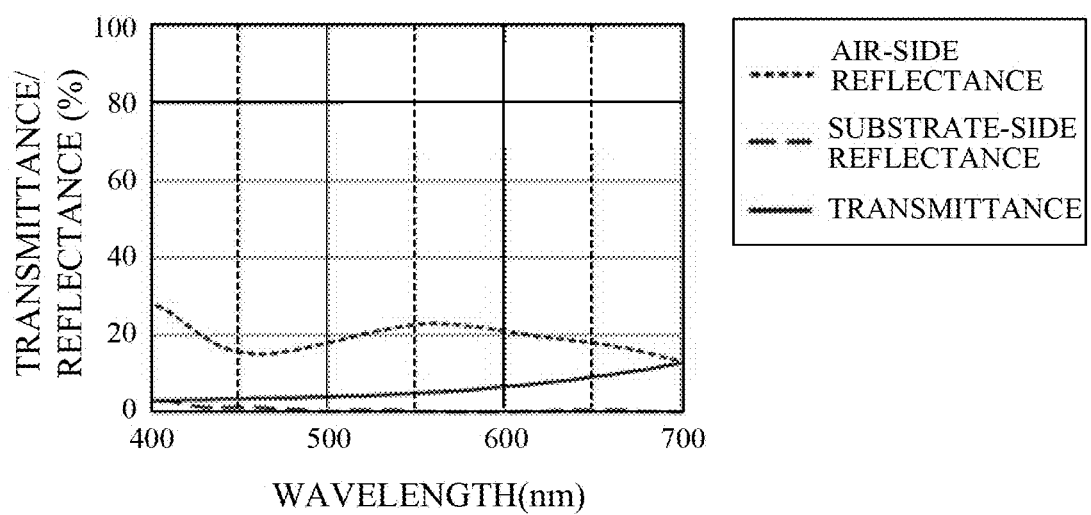

Table 3 shows the film configurations of optical filters of Embodiments 11 to 17. In these embodiments, the material of the substrate 01 is a glass material S2 having no light absorbency. The antireflection layer 02 as the first layer is formed as a multilayer film in which dielectric materials H2, M2 and H2 are laminated in order from the substrate side. The enhanced reflection layer 04 as the second layer is formed as a multilayer film in which the dielectric materials M2, H2, M2, H2 and M2 are laminated in order from the absorption layer side. The number of films (5) of the enhanced reflection layer 04 as the multilayer film is larger than that (3) of the antireflection layer 02 as the multilayer film. Both the dielectric materials M2 and H2 are materials having no light absorbency. FIG. 8A illustrates the refractive indices of the glass material S2 and the dielectric materials M2 and H2 at each wavelength.

The material of the absorption layer 03 is an absorbent material K4 having light absorbency. FIG. 8B illustrates the refractive index and the extinction coefficient of the absorbent material K4 at each wavelength. The extinction coefficient of the absorbent material K4 at the wavelength $\lambda$ of 550 nm is 0.20.

FIGS. 9A to 9G respectively illustrate the air-side reflectances, the substrate-side reflectances and the transmittances of the optical filters of Embodiments 11 to 17 at each wavelength. As can be seen from these drawings, the difference between the air-side reflectance and the substrate-side reflectance of the optical filter of each of Embodiments 11 to 17 at the wavelength $\lambda$ of 550 nm is 10% or more, which satisfies the condition of expression (1) (further the condition of expression (1)').

The film thicknesses of the absorbent material K4 in Embodiments 11 to 17 are, as shown in Table 3, 50 nm, 100 nm, 150 nm, 200 nm, 250 nm, 300 nm and 600 nm, respectively. The value of $kj \times dj$ in each of Embodiments 11 to 17 satisfies the condition of expression (2).

TABLE 3

| | | Refractive Index | Extinction Coefficient | Embodiment | | | | | | |
|---|---|---|---|---|---|---|---|---|---|---|
| | | $\lambda = 550$ nm | $\lambda = 550$ nm | 11 | 12 | 13 | 14 | 15 | 16 | 17 |
| | | | | Film Thickness (nm) | | | | | | |
| 9 | M2 | 1.47 | | 70.5 | 73,8 | 71.7 | 77.9 | 73.8 | 67.2 | 66.4 |
| 8 | H2 | 2.21 | | 84.2 | 48.7 | 82.2 | 59.2 | 56.2 | 52.0 | 51.6 |
| 7 | M2 | 1.47 | | 29.1 | 51.1 | 70.7 | 93.7 | 43.2 | 75.6 | 76.9 |
| 6 | H2 | 2.21 | | 75.9 | 60.1 | 72.3 | 67.7 | 75.9 | 54.5 | 64.4 |
| 5 | M2 | 1.47 | | 43.9 | 43.7 | 21.8 | 32.6 | 46.3 | 32.1 | 30.7 |
| 4 | K4 | 2.15 | 0.20 | 50.0 | 100.0 | 150.0 | 200.0 | 250.0 | 300.0 | 600.0 |
| 3 | H2 | 2.21 | | 72.8 | 28.9 | 44.4 | 17.0 | 46.9 | 10.0 | 10.0 |
| 2 | M2 | 1.47 | | 35.2 | 38.8 | 54.7 | 52.8 | 52.7 | 45.3 | 49.2 |
| 1 | H2 | 2.21 | | 24.1 | 12.0 | 10.0 | 10.0 | 11.5 | 12.7 | 10.0 |
| | S2 | 1.52 | | | | | | | | |

Figure 10B:
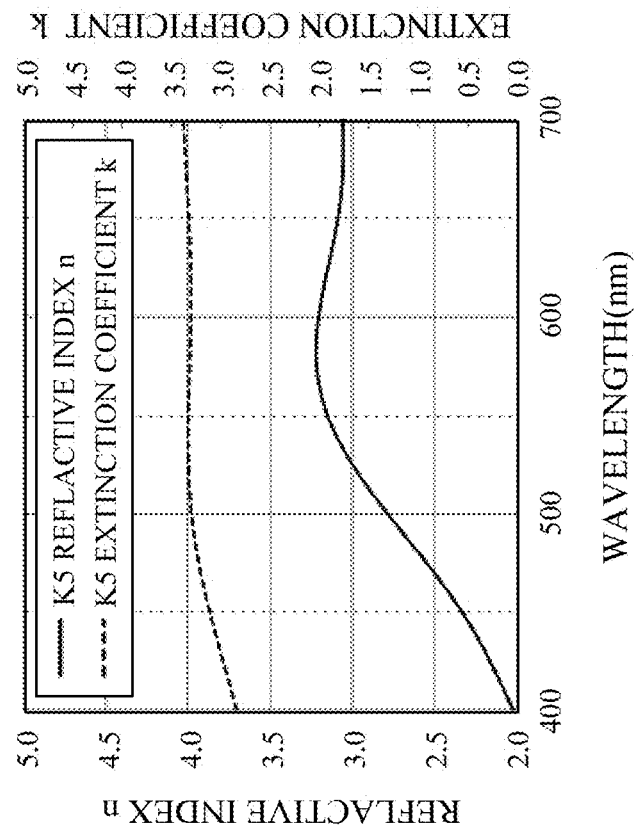
FIGS. 10A to 10D are diagrams illustrating refractive indices and extinction coefficients of materials used in optical filters of Embodiments 18 to 23.
Figure 10A:
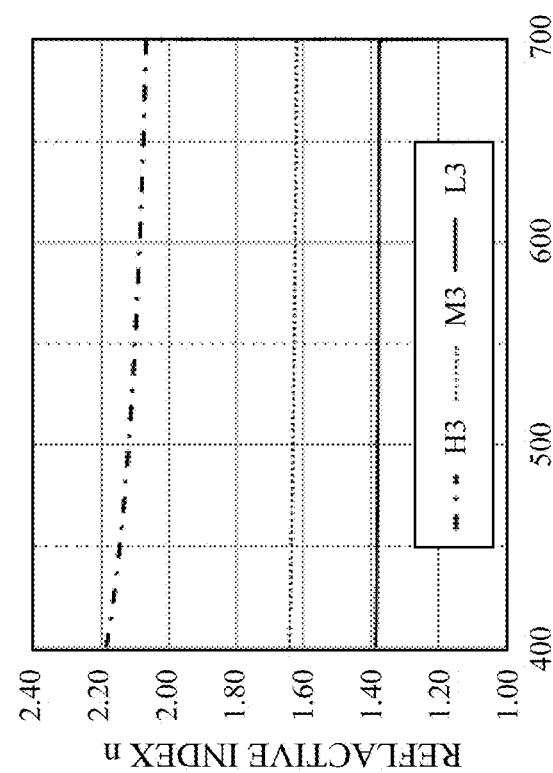

Table 4 shows the film configuration of an optical filter of Embodiment 18. The optical filter of this embodiment is provided on the substrate 01 made of the glass material S2, and is constituted by the enhanced reflection layer 04 as the first layer, the absorption layer 03, and the antireflection layer 02 as the second layer, which are laminated in order from the substrate side. The optical filter of this embodiment has a feature that the substrate-side reflectance R2 for an incident light incident from the substrate side is larger than the air-side reflectance R1 for the same incident light. Dielectric materials M3, H3 and L3 each have no light absorbency. FIG. 10A illustrates the refractive indices of these dielectric materials at each wavelength.

The material of the absorption layer 03 is an absorbent material K5 having light absorbency. FIG. 10B illustrates the refractive index and the extinction coefficient of the absorbent material K5 at each wavelength. The extinction coefficient of the absorbent material K5 at the wavelength λ of 550 nm is 3.33.

Figure 11:
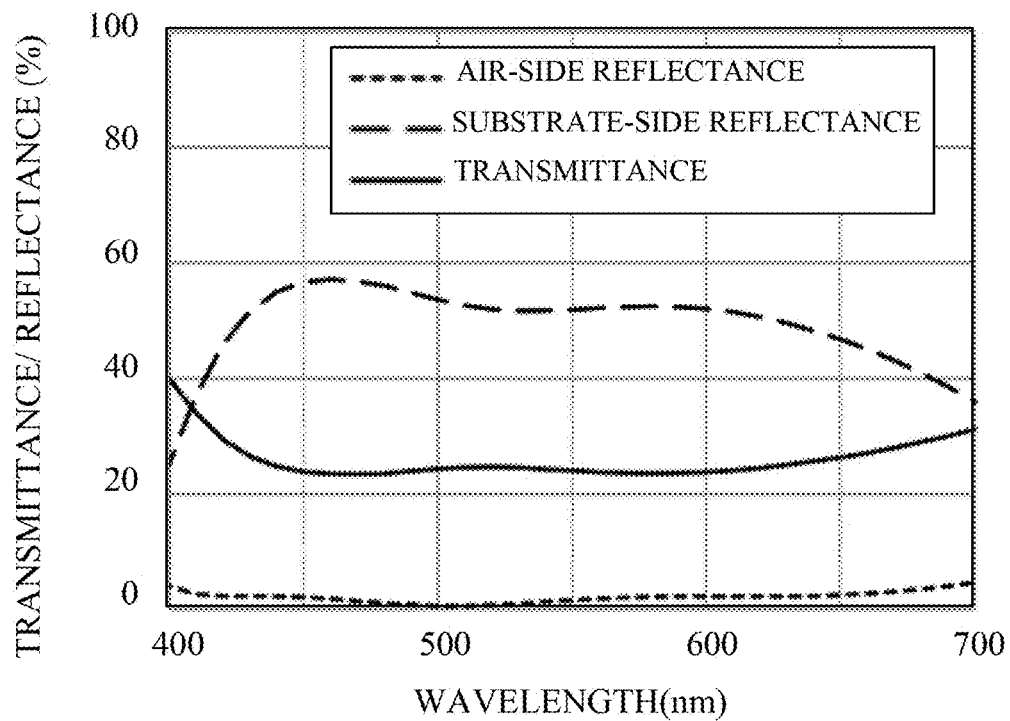
FIG. 11 is a diagram illustrating reflectance and transmittance characteristics of the optical filter of Embodiment 18.

FIG. 11 illustrates the air-side reflectances, the substrate-side reflectances and the transmittances of the optical filter of Embodiment 18 at each wavelength. As can be seen from FIG. 11, a difference between the air-side reflectance and the substrate-side reflectance of the optical filter of Embodiment 18 at the wavelength of 550 nm satisfies the condition of expression (1).

TABLE 4

|   |    | n550 | k550 | Film Thickness (nm) |
|---|----|------|------|---------------------|
| 9 | L3 | 1.38 | 0.00 | 36.9 |
| 8 | H3 | 2.10 | 0.00 | 24.5 |
| 7 | M3 | 1.63 | 0.00 | 15.0 |
| 6 | K5 | 3.15 | 3.33 | 12.0 |
| 5 | M3 | 1.63 | 0.00 | 83.5 |
| 4 | H3 | 2.10 | 0.00 | 54.4 |
| 3 | M3 | 1.63 | 0.00 | 77.9 |
| 2 | H3 | 2.10 | 0.00 | 120.6 |
| 1 | M3 | 1.63 | 0.00 | 44.1 |
|   | S2 | 1.52 | \ | \ |

Table 5 shows the film configuration of an optical filter of Embodiment 19. The configuration of the optical filter of this embodiment is the same as that of Embodiment 18.

Figure 10D:
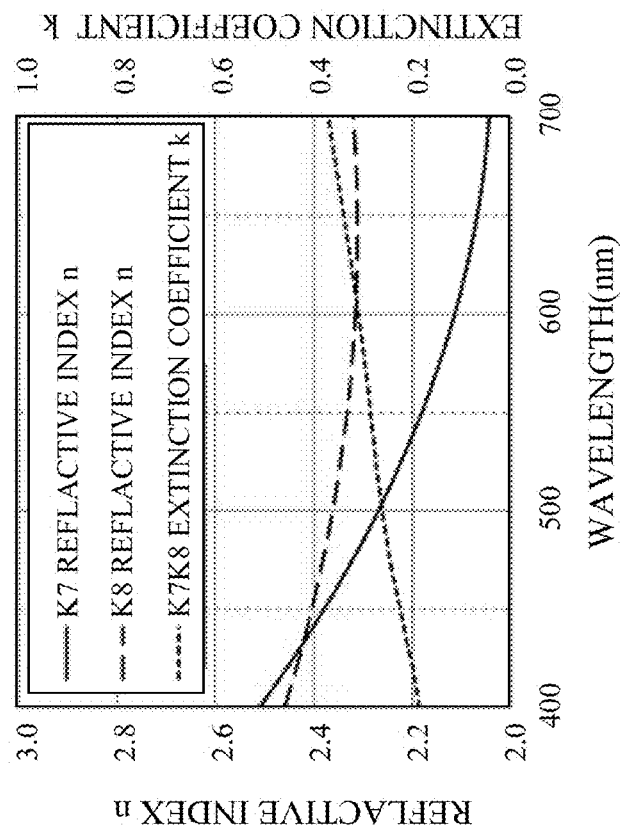
Figure 10C:
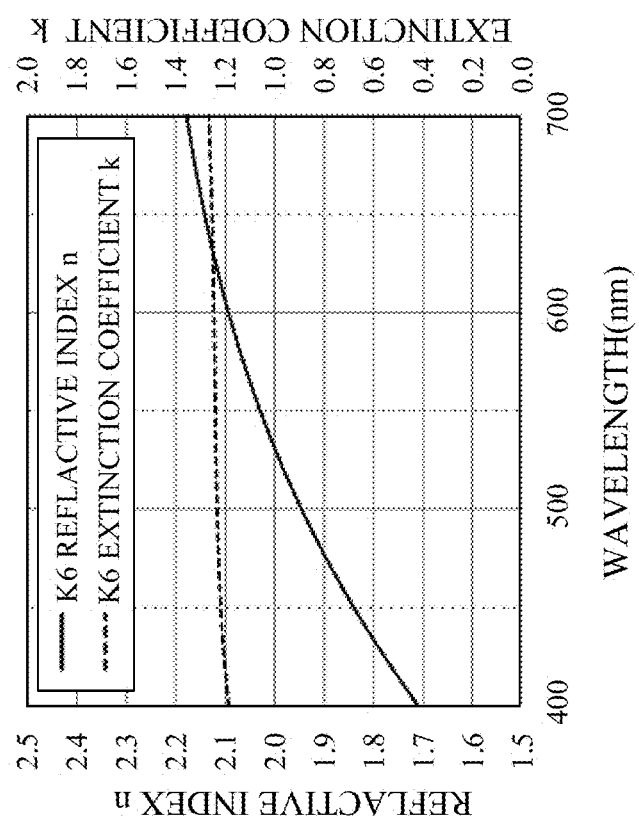

The material of the absorption layer 03 is an absorbent material K6 having light absorbency. FIG. 10C illustrates the refractive index and the extinction coefficient of the absorbent material K6 at each wavelength. The extinction coefficient of the absorbent material K6 at the wavelength of 550 nm is 1.24.

Figure 12:
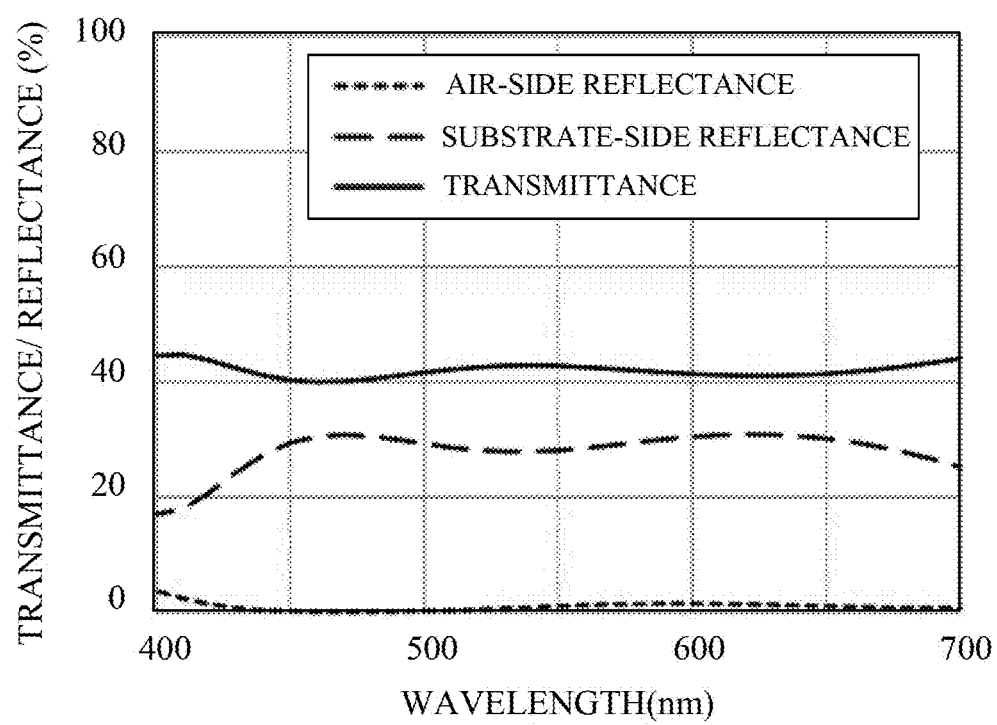
FIG. 12 is a diagram illustrating reflectance and transmittance characteristics of the optical filter of Embodiment 19.

FIG. 12 illustrates the air-side reflectance, the substrate-side reflectance and the transmittance of the optical filter of Embodiment 19 at each wavelength. As can be seen from FIG. 12, the optical filter of Example 19 satisfies the condition of expression (1).

TABLE 5

|   |    | n550 | k550 | Film Thickness (nm) |
|---|----|------|------|---------------------|
| 9 | L3 | 1.38 | 0.00 | 38.0 |
| 7 | M3 | 1.63 | 0.00 | 36.3 |
| 6 | K6 | 2.03 | 1.24 | 25.0 |
| 5 | M3 | 1.63 | 0.00 | 51.7 |
| 4 | H3 | 2.10 | 0.00 | 71.4 |
| 3 | M3 | 1.63 | 0.00 | 123.3 |
| 2 | H3 | 2.10 | 0.00 | 110.5 |
| 1 | M3 | 1.63 | 0.00 | 78.6 |
|   | S2 | 1.52 | \ | \ |

Table 6 shows the film configuration of an optical filter of Embodiment 20. The configuration of the optical filter of this embodiment is the same as those of Embodiments 11 to 17.

The material of the absorption layer 03 is the absorbent material K6 having light absorbency. The extinction coefficient of the absorbent material K6 at the wavelength of 550 nm is 1.24.

Figure 13:
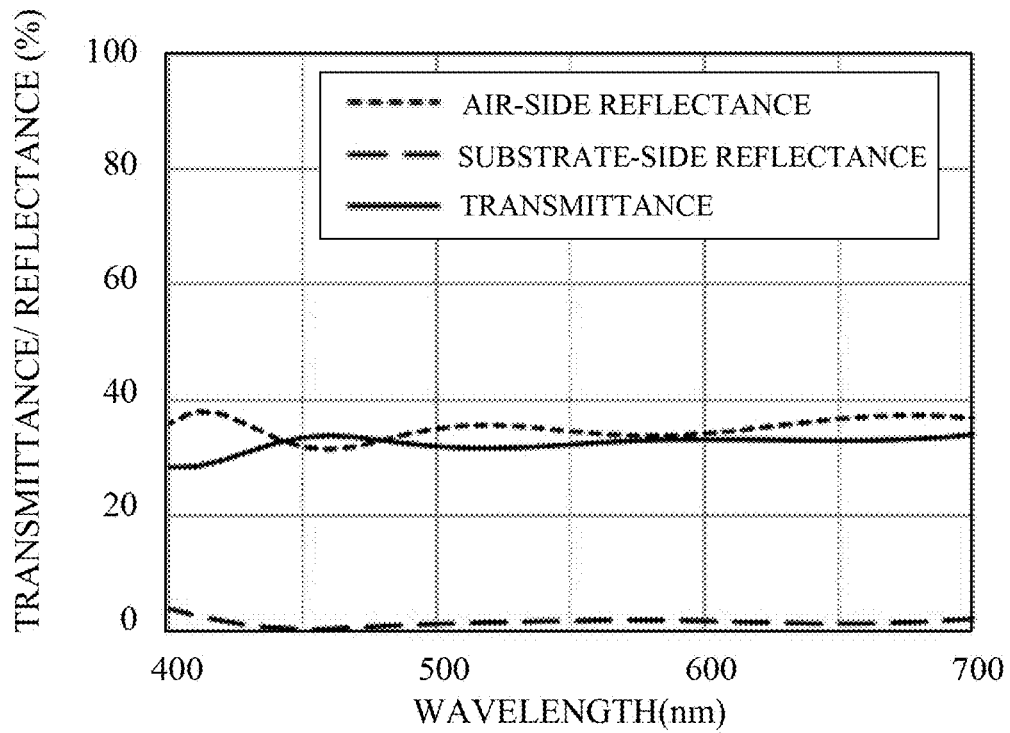
FIG. 13 is a diagram illustrating reflectance and transmittance characteristics of the optical filter of Embodiment 20.

FIG. 13 illustrates the air-side reflectance, the substrate-side reflectance and the transmittance of the optical filter of Embodiment 20 at each wavelength. As can be seen from FIG. 13, the optical filter of Embodiment 20 satisfies the condition of expression (1).

TABLE 6

|   |    | n550 | k550 | Film Thickness (nm) |
|---|----|------|------|---------------------|
| 9 | L3 | 1.38 | 0.00 | 89.1 |
| 8 | H3 | 2.10 | 0.00 | 98.5 |
| 7 | M3 | 1.63 | 0.00 | 121.7 |
| 6 | H3 | 2.10 | 0.00 | 53.1 |
| 5 | M3 | 1.63 | 0.00 | 63.2 |
| 4 | K6 | 2.03 | 1.24 | 34.0 |
| 3 | H3 | 2.10 | 0.00 | 48.6 |
| 2 | M3 | 1.63 | 0.00 | 63.9 |
| 1 | H3 | 2.10 | 0.00 | 15.0 |
|   | S2 | 1.52 | \ | \ |

Table 7 shows the film configuration of an optical filter of Embodiment 21. The configuration of the optical filter of this example is the same as that of Embodiment 18.

The materials of the absorption layer 03 are absorbent materials K7 and K8 each having light absorbency. FIG. 10D illustrates the refractive indices of the absorbent materials K7 and K8 at each wavelength and an average extinction coefficient of the two absorbent materials. The average extinction coefficient of the two absorbent materials at the wavelength of 550 nm is 0.29.

Figure 14:
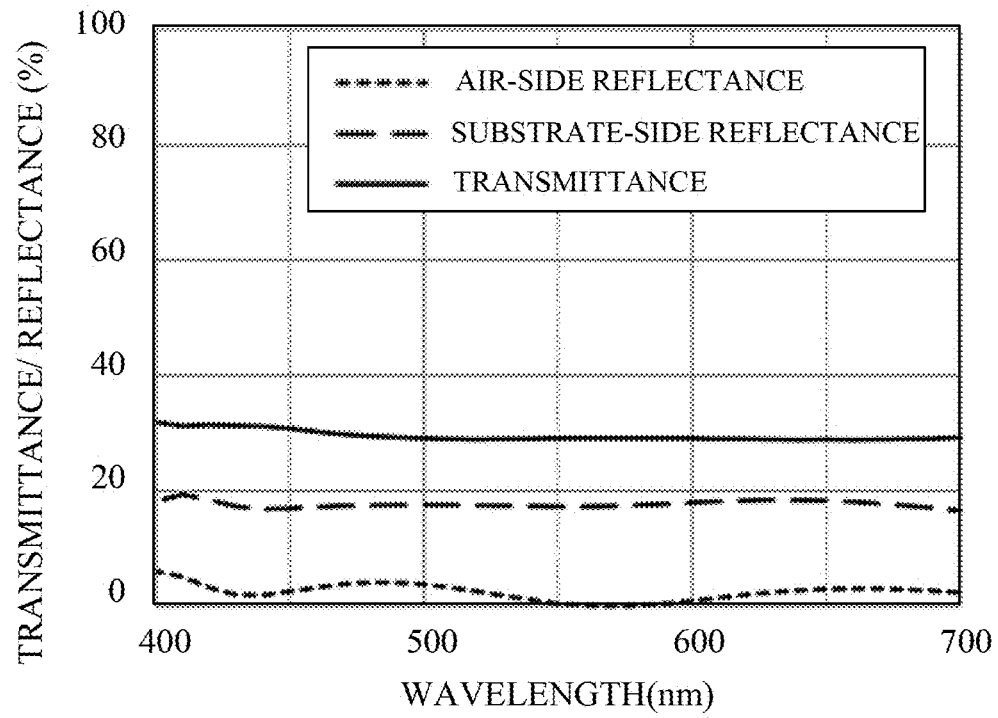
FIG. 14 is a diagram illustrating reflectance and transmittance characteristics of the optical filter of Embodiment 21.

FIG. 14 illustrates the air-side reflectance, the substrate-side reflectance and the transmittance of the optical filter of Embodiment 21 at each wavelength. As can be seen from FIG. 14, the optical filter of Embodiment 21 satisfies the condition of expression (1).

TABLE 7

|    |    | n550 | k550 | Film Thickness (nm) |
|----|----|------|------|---------------------|
| 10 | L3 | 1.38 | 0.00 | 102.5 |
| 9  | H3 | 2.10 | 0.00 | 33.0 |
| 8  | M3 | 1.63 | 0.00 | 15.0 |
| 7  | K8 | 2.33 | 0.29 | 80.0 |
| 6  | K7 | 2.18 | 0.29 | 80.0 |
| 5  | M3 | 1.63 | 0.00 | 46.2 |
| 4  | H3 | 2.10 | 0.00 | 78.8 |
| 3  | M3 | 1.63 | 0.00 | 76.2 |
| 2  | H3 | 2.10 | 0.00 | 118.8 |
| 1  | M3 | 1.63 | 0.00 | 92.7 |
|    | S2 | 1.52 | \ | \ |

Table 8 shows the film configuration of an optical filter of Embodiment 22. The configuration of the optical filter of this embodiment is the same as that of Embodiment 18.

The materials of the absorption layer 03 are the absorbent materials K7 and K8 each having light absorbency. The average extinction coefficient of the two absorbent materials at a wavelength of 550 nm is 0.29.

Figure 15:
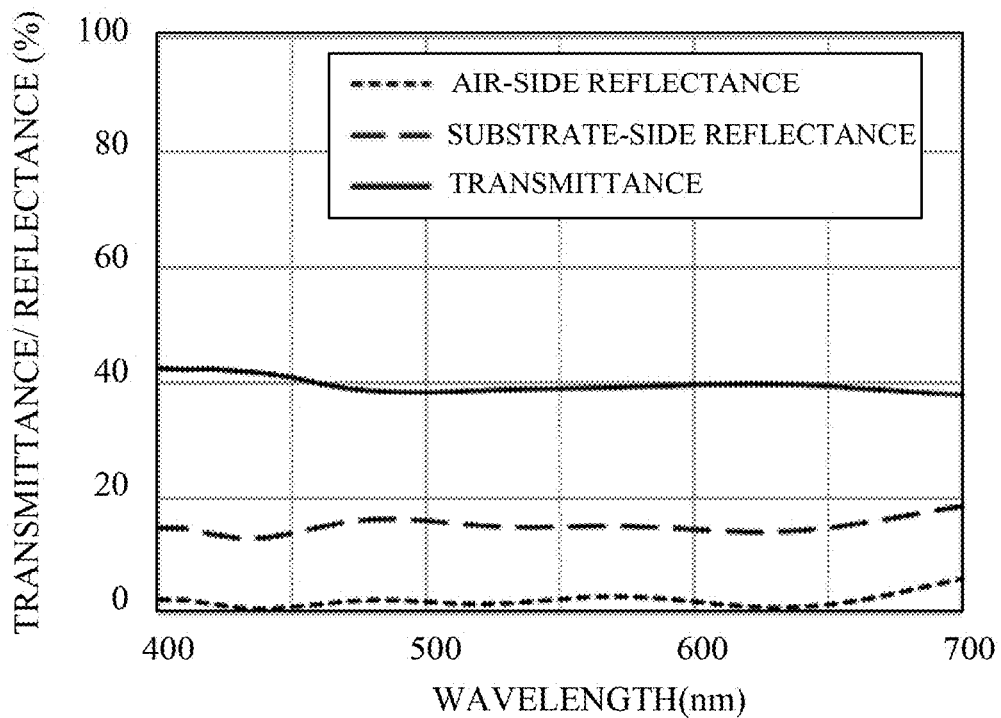
FIG. 15 is a diagram illustrating reflectance and transmittance characteristics of the optical filter of Embodiment 22.

FIG. 15 illustrates the air-side reflectance, the substrate-side reflectance and the transmittance of the optical filter of Embodiment 22 at each wavelength. As can be seen from FIG. 15, the optical filter of Embodiment 22 satisfies the condition of expression (1).

TABLE 8

|  |  | n550 | k550 | Film Thickness (nm) |
|---|---|---|---|---|
| 12 | L3 | 1.38 | 0.00 | 87.3 |
| 11 | H3 | 2.10 | 0.00 | 121.3 |
| 10 | M3 | 1.63 | 0.00 | 41.7 |
| 9 | H3 | 2.10 | 0.00 | 39.9 |
| 8 | M3 | 1.63 | 0.00 | 15.0 |
| 7 | K8 | 2.33 | 0.29 | 60.0 |
| 6 | K7 | 2.18 | 0.29 | 60.0 |
| 5 | M3 | 1.63 | 0.00 | 43.8 |
| 4 | H3 | 2.10 | 0.00 | 84.9 |
| 3 | M3 | 1.63 | 0.00 | 40.0 |
| 2 | H3 | 2.10 | 0.00 | 111.6 |
| 1 | M3 | 1.63 | 0.00 | 81.4 |
|  | S2 | 1.52 | \ | \ |

Table 9 shows the film configuration of an optical filter of Embodiment 23. The optical filter of this embodiment is provided on the substrate 01 made of the glass material S2, and is constituted by the enhanced reflection layer 04 as the first layer, the absorption layer 03, the antireflection layer 02 as the second layer, a joining member S3, and an optical component S4, which are laminated in order from the substrate side. The optical component S4 is in close contact with and joined to the second layer via the joining member S3, and the optical filter is disposed at their joining interface. The refractive indices of the glass material S2, the joining member S3 and the optical component S4 at the wavelength of 550 nm satisfy the condition of expression (8).

In order to reduce reflection at the interface between the joining member S3 and the optical component S4, a layer having an antireflection effect may be provided at the interface between the joining member S3 and the optical component S4.

The material of the absorption layer 03 is the absorbent material K6 having light absorbency, and the extinction coefficient thereof at the wavelength of 550 nm is 1.24.

Figure 16:
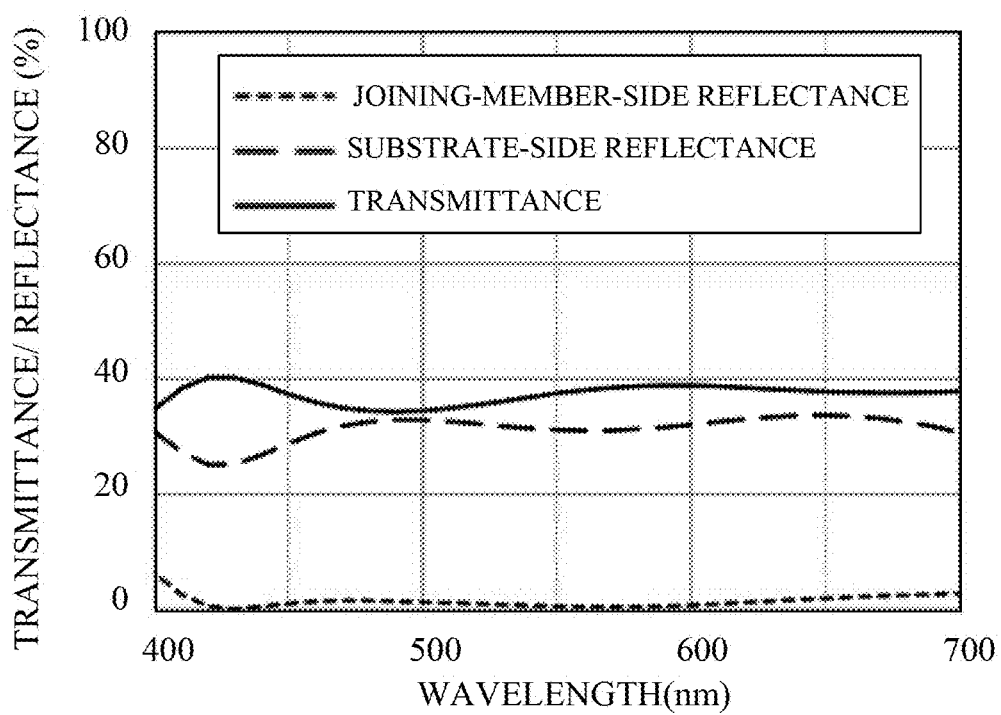
FIG. 16 is a diagram illustrating reflectance and transmittance characteristics of the optical filter of Embodiment 23.

FIG. 16 illustrates the joining-member-side reflectance, the substrate-side reflectance and the transmittance of the optical filter of Embodiment 23 at each wavelength. As can be seen from FIG. 16, the optical filter of Embodiment 23 satisfies the condition of expression (1).

TABLE 9

|  |  | n550 | k550 | Film Thickness (nm) |
|---|---|---|---|---|
|  | S4 | 1.85 | \ | \ |
|  | S3 | 1.56 | \ | \ |
| 11 | M3 | 1.63 | 0.00 | 77.6 |
| 10 | H3 | 2.10 | 0.00 | 122.4 |
| 9 | M3 | 1.63 | 0.00 | 81.7 |
| 8 | H3 | 2.10 | 0.00 | 21.7 |
| 7 | M3 | 1.63 | 0.00 | 15.0 |
| 6 | K6 | 2.03 | 1.24 | 30.0 |
| 5 | M3 | 1.63 | 0.00 | 70.9 |
| 4 | H3 | 2.10 | 0.00 | 54.2 |
| 3 | M3 | 1.63 | 0.00 | 137.7 |
| 2 | H3 | 2.10 | 0.00 | 119.8 |
| 1 | M3 | 1.63 | 0.00 | 76.7 |
|  | S2 | 1.52 | \ | \ |

Table 10 collectively shows various numerical values of each embodiment. The transmittance is a value at the wavelength of 550 nm.

TABLE 10

|  | Transmittance | R1 | R2 | \|R1−R2\| | R1/R2 | R2/R1 |
|---|---|---|---|---|---|---|
| Embodiment 1 | 60.6 | 16.1 | 2.4 | 13.68 | 0.15 | — |
| Embodiment 2 | 38.8 | 16.7 | 1.9 | 14.86 | 0.11 | — |
| Embodiment 3 | 26.2 | 18.1 | 1.9 | 16.19 | 0.11 | — |
| Embodiment 4 | 17.4 | 19.8 | 0.5 | 19.26 | 0.03 | — |
| Embodiment 5 | 11.8 | 18.0 | 0.9 | 17.10 | 0.05 | — |
| Embodiment 6 | 19.8 | 19.8 | 6.8 | 13.01 | 0.34 | — |
| Embodiment 7 | 29.8 | 19.2 | 3.9 | 15.27 | 0.20 | — |
| Embodiment 8 | 18.0 | 18.6 | 0.9 | 17.70 | 0.05 | — |
| Embodiment 9 | 10.6 | 19.2 | 0.1 | 19.12 | 0.01 | — |
| Embodiment 10 | 6.5 | 18.4 | 0.7 | 17.66 | 0.04 | — |
| Embodiment 11 | 67.3 | 17.6 | 5.6 | 12.01 | 0.32 | — |
| Embodiment 12 | 51.4 | 19.2 | 4.9 | 14.27 | 0.25 | — |
| Embodiment 13 | 41.1 | 18.8 | 3.8 | 15.08 | 0.20 | — |
| Embodiment 14 | 34.4 | 15.0 | 1.8 | 13.19 | 0.12 | — |
| Embodiment 15 | 25.3 | 20.4 | 1.8 | 18.58 | 0.09 | — |
| Embodiment 16 | 19.7 | 22.4 | 0.4 | 22.00 | 0.02 | — |
| Embodiment 17 | 4.9 | 22.7 | 0.3 | 22.41 | 0.01 | — |
| Embodiment 18 | 24.1 | 1.6 | 51.9 | 50.29 | — | 0.03 |
| Embodiment 19 | 42.8 | 1.1 | 28.2 | 27.03 | — | 0.04 |
| Embodiment 20 | 32.2 | 34.5 | 1.7 | 32.88 | 0.05 | — |
| Embodiment 21 | 29.1 | 0.5 | 17.3 | 16.81 | — | 0.03 |
| Embodiment 22 | 39.1 | 2.5 | 15.0 | 12.54 | — | 0.17 |
| Embodiment 23 | 37.5 | 0.6 | 31.2 | 30.53 | — | 0.02 |

In each of Embodiments 11 to 23, the transmittance has wavelength dispersion dependency. An imaging apparatus illustrated in FIG. 17 may perform color balance correction on a captured image if the correction is required as a result of the wavelength dispersion dependency. Further, a change in color balance due to the optical filter 10 may be canceled by a transmittance wavelength characteristic of an antireflection film 20 illustrated in FIG. 17. When a* and b* represent chromaticity coordinates in CIE1976L*a*b* color space, the optical filter may be configured such that a transmitted light from the optical filter 10 and any one of the chromaticity coordinates a* and b* of the antireflection film 20 have mutually different signs.

Further, Embodiments 1 to 22 have described the case where the material of the air-side outermost film is L1 whose refractive index is 1.38, M1 whose refractive index is 1.45, M2 whose refractive index is 1.47 or L3 whose refractive index is 1.38. However, a layer containing a fluorine-based material may be added to their surface. As the fluorine-based material, OF-SR, OF-210, etc. manufactured by Canon Optron Co., Ltd. can be used. Adding such a layer makes it possible to enhance an antifouling property of a lens surface.

Figure 17:
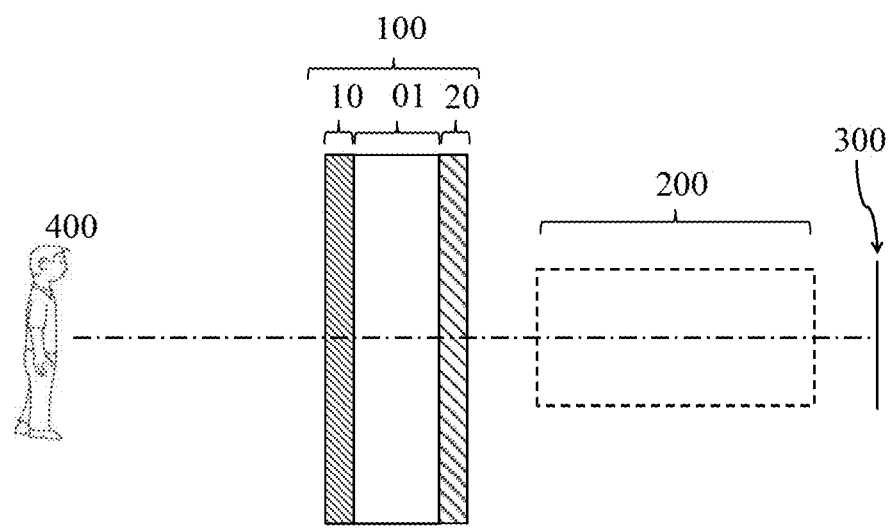
FIG. 17 is a schematic view of imaging using the optical element including the optical filter of each embodiment.

FIG. 17 illustrates imaging using the optical element 100 including the optical filter 10 according to any one of Embodiments 1 to 23 described above. The optical element 100 is disposed between an object 400 and an imaging optical system 200 of the above-mentioned imaging apparatus. An image sensor 300 such as a CCD sensor or a CMOS sensor is disposed on an image plane of the imaging optical system 200.

In the optical element 100, the optical filter 10 is provided on an object-side surface of the substrate 01, and the above-mentioned antireflection film 20 is provided on an imaging-optical-system-side surface of the substrate 01. The antireflection film 20 may be a general antireflection film, and its film structure and material are not limited. Further, the substrate 01 may be exposed to an atmosphere without using the antireflection film 20.

Since the optical filter 10 serves as a reflection film for an incident light incident from the object 400, an image of the object 400 is reflected on the optical filter 10. Therefore, the object 400 or another person can capture with the image sensor 300 through the imaging optical system 200 while checking facial expression, pose and the like of the object 400.

Light reflected by the imaging optical system 200 or the image sensor 300 makes incident on the antireflection film 20. A part of the light incident on the antireflection film 20 passes through the antireflection film 20 and then enters the optical filter 10 through the substrate 10. Since the optical filter 10 serves as an antireflection film for an incident light incident from the side opposite to the object 400, an unnecessary light that makes incident from the side opposite to the object 400, is reflected by the optical filter 10 and then returns to the image sensor 300 can be reduced, and thereby occurrence of ghost and flare can be suppressed.

Further, an image display element such as a light modulation element may be disposed instead of the imaging optical system 200 and the image sensor 300. In this case, a smart mirror can be configured that is capable of superimposing character information, a captured image, a synthetic image and the like on a reflected image on the optical filter 10 that can be seen from the object side. In the case where the image display element is disposed and the optical filter 10 has a high object-side reflectance, it becomes difficult to recognize a clear image due to flare or the like.

Moreover, when a person obliquely views the image display element without facing the image display element, the person visually recognizes multiple mirror images mutually shifted due to light reflected from the optical filter 10. Since the optical filter 10 of each embodiment reduces the reflected light, a clear image can be visually recognized.

The optical filter 10 may be disposed on either the object side or the imaging optical system side of the substrate 01 according to a magnitude relation between the reflectances of the optical filter 10 on the object side and on the side opposite to the object 400.

The optical filter of each embodiment may be used in an apparatus for recognizing an image or the like by using reflected light. Such an apparatus includes HUD (Head-Up Display), HMD (Head Mounted Display), a prompter, and the like. Reducing reflection on a side opposite to a side on which the reflected light is recognized makes it possible to reduce an unnecessary light such as flare and the like to improve visibility of the reflected light.

Furthermore, the optical filter of each embodiment may be used in an image acquisition apparatus using coaxial epi-illumination. Since the optical filter of each embodiment can reflect an illumination light well and reduce reflection on a side of the image acquisition apparatus, reflection of the image acquisition apparatus and its surrounding environment, flare due to an ambient light and the like can be suppressed.

Figure 18:
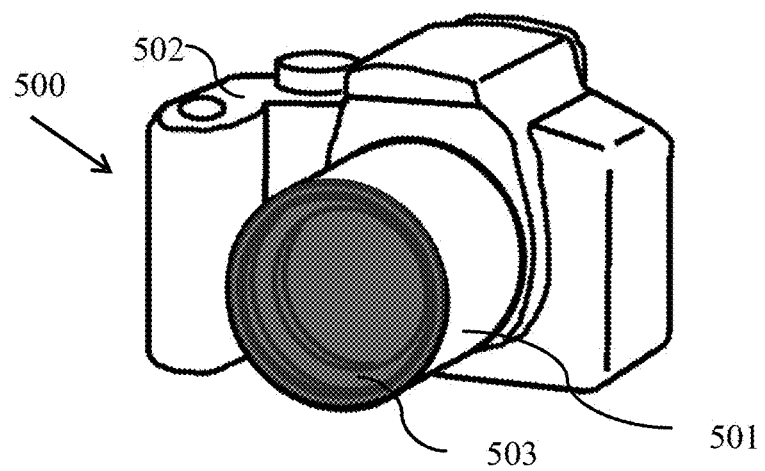
FIG. 18 is a schematic view of a digital camera using the optical element including the optical filter of each embodiment.

FIG. 18 illustrates a digital camera 500 as an imaging apparatus that is an embodiment. The digital camera 500 includes a lens unit 501, and a camera body 502. The lens unit 501 may be integrally configured with the camera body 502, or may be detachable (interchangeable) with respect to the camera body 502.

An optical element 503 in which the optical filter 10 of any one of Embodiments 1 to 23 is provided on an object-side surface of the substrate (not illustrated) is disposed at an object-side end of the lens unit 501. An object can see his/her own image reflected in a front surface of the lens unit 501. An unnecessary light generated by reflection in the lens unit 501 and the camera body 502 makes incident on the optical filter 503 from the substrate side. However, the optical filter 503 serving as an antireflection film prevents the unnecessary light from returning into the lens unit 501 and the camera body 502. Therefore, occurrence of ghost and flare, that is, deterioration of a captured image can be suppressed.

It is desirable, from a viewpoint in which the object sees his/her own image, that the substrate 01 on which the optical filter 10 of each of Embodiments 1 to 23 is provided have a convex surface shape toward the object side (that is, an incident side where the reflectance of the optical filter is higher than that on a side opposite thereto). Such a substrate shape enlarges the image reflected on the optical filter 10 that is seen from the object side, which makes it easy for the object to check his/her facial expression, pose and the like. Further, it is desirable that the substrate 01 have a shape providing no or little optical power (refractive power). such a substrate shape can reduce aberration generated by the substrate 01, and thereby an influence of the aberration on image forming performance of the lens unit 501 can be reduced.

Since the optical element 503 is attached to the object-side end of the lens unit 501 of the digital camera 500, it is desirable that the diameter of the substrate 01 be 10 mm to 300 mm. In particular, in a case of capturing portraits and the like, it is preferable that the diameter be 50 to 150 mm. In a case of a video camera that captures moving images, it is preferable that the diameter be 100 mm to 300 mm because the diameter of the lens unit 501 is large. It is preferable, from a viewpoint in which the object checks his/her facial expression and a state of his/her whole body when the distance between the object and the camera 500 is in a range from 0.5 m to 5.0 m, that the radius of curvature of the convex surface of the substrate 01 be 200 mm to co.

Further, it is preferable, from a viewpoint of suppressing aberration that deteriorates a captured image, that the thickness of the substrate 01 be 0.2 mm or more and 8.0 mm or less. In particular, since the optical element 503 is attached to the object-side end of the lens unit 501, it is more preferable that the thickness of the substrate 01 be 1.5 mm or more and 5.0 mm or less.

Figure 19:
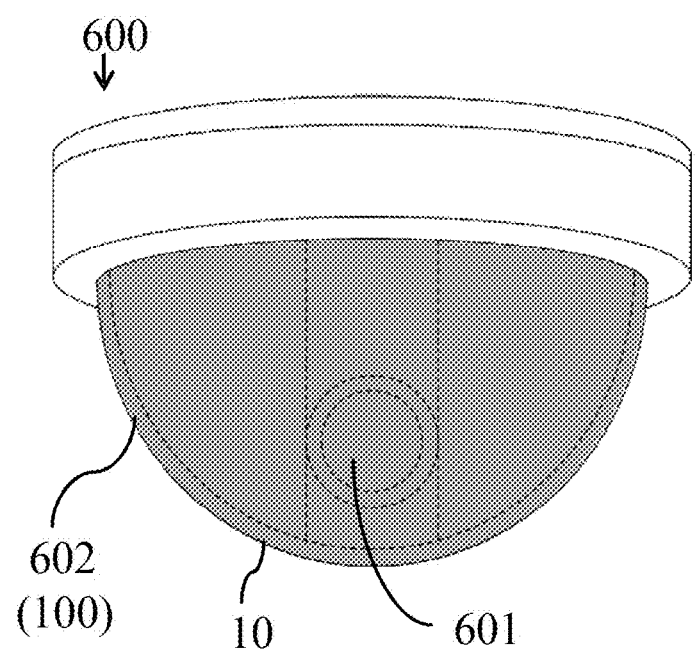
FIG. 19 is a schematic view of a surveillance camera using the optical element including the optical filter of each embodiment.

FIG. 19 illustrates a surveillance camera 600 as an imaging apparatus as an embodiment. The surveillance camera 600 includes a camera unit 601 including a lens, and a cover element 602 as a dome-shaped optical element 100 that covers the camera unit 601.

The optical filter 10 of any one of Embodiments 1 to 23 is provided on an outer surface of a dome-shaped substrate of the cover element 602. Therefore, the reflectance of the outer surface (optical filter 10) of the cover element 602 becomes high, and thereby an outside world is reflected on the outer surface of the cover element 602, which makes it difficult to see the orientation of the camera unit 601 disposed inside the cover element 602. As a result, it is possible to alleviate alertness and tension of a monitored object such as a passerby located in the outside world.

Further, since reflection of light incident on the cover element 602 from the camera unit 601 is prevented by the optical filter 10, it is possible to suppress deterioration of a surveillance image due to ghost and flare caused by an unnecessary light reflected by the cover element 602.

Furthermore, the present invention is not limited to these embodiments and various variations and modifications may be made without departing from the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-068782, filed on Apr. 7, 2020 and 2021-003913, filed on Jan. 14, 2021 which are hereby incorporated by reference herein in their entirety.

What is claimed is:

1. An optical filter provided on a substrate, the optical filter comprising in order from a substrate side:
   a first layer made of a material whose extinction coefficient at the wavelength of 550 nm is 0.02 or less;
   an absorption layer having light absorbency; and
   a second layer made of a material whose extinction coefficient at the wavelength of 550 nm is 0.02 or less, the substrate, the first layer, the absorption layer, and the second layer being mutually adjacent,
   wherein the following conditions are satisfied:

$R2-R1 \geq 10[\%]$, and $$8[\text{nm}] \leq \sum_{j=1}^{m} kj \times dj \leq 132[\text{nm}]$$

where R1 [%] represents a reflectance of the optical filter for light whose wavelength is 550 nm and that makes incident on the optical filter from a side opposite to the substrate, and R2 [%] represents a reflectance of the optical filter for light whose wavelength is 550 nm and that makes incident on the optical filter from the substrate side, and
   where m represents a number of films constituting the absorption layer, kj represents an extinction coefficient of a j-th film counted from the substrate side among the m films at the wavelength of 550 nm, and dj [nm] represents a physical film thickness of the j-th film.

2. An optical filter provided on a substrate, the optical filter comprising in order from a substrate side:
   a first layer made of a material whose extinction coefficient at the wavelength of 550 nm is 0.02 or less;
   an absorption layer having light absorbency; and
   a second layer made of a material whose extinction coefficient at the wavelength of 550 nm is 0.02 or less, the substrate, the first layer, the absorption layer, and the second layer being mutually adjacent,
   wherein a number of films constituting the first layer is larger than a number of films constituting the second layer, and
   wherein the following condition is satisfied:

$R2-R1 \geq 10[\%]$ where R1 [%] represents a reflectance of the optical filter for light whose wavelength is 550 nm and that makes incident on the optical filter from a side opposite to the substrate, and R2 [%] represents a reflectance of the optical filter for light whose wavelength is 550 nm and that makes incident on the optical filter from the substrate side.

3. The optical filter according to claim 2, wherein the following condition is satisfied:

$0 \leq R1/R2 \leq 0.5$.

4. The optical filter according to claim 2, wherein:
   the second layer includes an outermost film on a side opposite to the absorption layer, and the outermost film is in contact with a medium; and
   the following condition is satisfied:

$0 \leq dn \leq 0.40$ where do represents a difference in refractive index between the outermost film and the medium.

5. The optical filter according to claim 2, wherein the second layer is in contact with air.

6. The optical filter according to claim 2, wherein the following condition is satisfied:

$$8[\text{nm}] \leq \sum_{j=1}^{m} kj \times dj \leq 132[\text{nm}]$$

where m represents a number of films constituting the absorption layer, kj represents an extinction coefficient of a j-th film counted from the substrate side among the m films at the wavelength of 550 nm, dj [nm] represents a physical film thickness of the j-th film.

7. The optical filter according to claim 6, wherein the following condition is satisfied:

$1.8 \leq nj \leq 4.2$ where nj represents a refractive index of the j-th film.

8. The optical filter according to claim 6, wherein the following condition is satisfied:

$0.05 \leq kj$.

9. An optical element comprising:
   a substrate made of glass or plastic; and
   an optical filter provided on the substrate,
   wherein the optical filter comprises in order from a substrate side:
   a first layer made of a material whose extinction coefficient at a wavelength of 550 nm is 0.02 or less;
   an absorption layer having light absorbency; and
   a second layer made of a material whose extinction coefficient at the wavelength of 550 nm is 0.02 or less, the substrate, the first layer, the absorption layer, and the second layer being mutually adjacent,
   wherein a thickness of the substrate is 0.2 mm or more and 8.0 mm or less, and
   wherein the following condition is satisfied:

$R2-R1 \geq 10[\%]$ where R1 [%] represents a reflectance of the optical filter for light whose wavelength is 550 nm and that makes incident on the optical filter from a side opposite to the substrate, and R2 [%] represents a reflectance of the optical filter for light whose wavelength is 550 nm and that makes incident on the optical filter from the substrate side.

10. The optical element according to claim 9, wherein the substrate has a shape convex toward an incident side on which the reflectance of the optical filter is higher than that on a side opposite thereto.

11. An imaging apparatus comprising:
    the optical filter according to claim 9; and
    an image sensor configured to capture an object through the optical filter.

12. The optical element according to claim 9, further comprising an optical component,
    wherein the optical component and the second layer are in close contact with each other via a joining member.

13. The optical element according to claim 12, wherein the following condition is satisfied:

$|ns-na| \leq |ne-na|$ where ns, ne and na respectively represent refractive indices of the substrate, the optical component and the joining member at the wavelength of 550 nm.

* * * * *